US009411559B2

(12) United States Patent
Avadhanula et al.

(10) Patent No.: US 9,411,559 B2
(45) Date of Patent: Aug. 9, 2016

(54) RESOLUTION OF TEXTUAL CODE IN A GRAPHICAL HIERARCHICAL MODEL OF A TECHNICAL COMPUTING ENVIRONMENT

(71) Applicant: The MathWorks, Inc., Natick, MA (US)

(72) Inventors: Srinath Avadhanula, Sudbury, MA (US); Pieter J. Mosterman, Framingham, MA (US); Yit Phang Khoo, Natick, MA (US); John P. Dirner, Boston, MA (US); Krishna Balasubramanian, Wellesley, MA (US); Ebrahim Mestchian, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 14/285,980

(22) Filed: May 23, 2014

(65) Prior Publication Data
US 2014/0359566 A1    Dec. 4, 2014

Related U.S. Application Data

(60) Provisional application No. 61/827,863, filed on May 28, 2013.

(51) Int. Cl.
*G06F 9/44* (2006.01)
*G06F 9/45* (2006.01)

(52) U.S. Cl.
CPC .. *G06F 8/35* (2013.01); *G06F 8/10* (2013.01); *G06F 8/34* (2013.01); *G06F 8/51* (2013.01); *G06F 9/4425* (2013.01)

(58) Field of Classification Search
None
See application file for complete search history.

(56) References Cited

U.S. PATENT DOCUMENTS

| 5,313,574 A | * | 5/1994 | Beethe | G06F 9/4843 715/763 |
| 5,497,500 A | * | 3/1996 | Rogers | G06F 3/0481 714/E11.217 |
| 5,821,934 A | * | 10/1998 | Kodosky | G06F 3/04847 703/15 |

(Continued)

FOREIGN PATENT DOCUMENTS

WO    WO 2007/027622    3/2007

OTHER PUBLICATIONS

Notification of Transmittal of the International Search Report and The Written Opinion of the International Searching Authority, or the Declaration corresponding to PCT/US2014/039574, mailed on Nov. 10, 2014, 10 pages.

(Continued)

*Primary Examiner* — Emerson Puente
*Assistant Examiner* — Erika Kretzmer
(74) *Attorney, Agent, or Firm* — Harrity & Harrity, LLP

(57) ABSTRACT

A device may receive a chart generated via a technical computing environment, where the chart includes a textual portion and a graphical portion, and the graphical portion includes state information. The device may parse the chart into the textual portion and the graphical portion, and may process the textual portion with a textual engine of the technical computing environment to generate textual results. The device may process the graphical portion with a graphical engine of the technical computing environment to generate graphical results, and may combine the textual results with the graphical results to generate chart results. The device may output or store the chart results.

20 Claims, 21 Drawing Sheets

(56) References Cited

U.S. PATENT DOCUMENTS

| | | | | |
|---|---|---|---|---|
| 6,282,699 B1* | 8/2001 | Zhang | G06F 8/34 | 715/967 |
| 7,020,850 B2* | 3/2006 | Raghavan | G06F 8/34 | 703/23 |
| 7,200,843 B2* | 4/2007 | Shann | | 717/162 |
| 7,487,076 B2* | 2/2009 | Szpak | G06F 17/5009 | 703/14 |
| 7,801,715 B2* | 9/2010 | Ciolfi | G06F 17/5009 | 703/13 |
| 7,809,545 B2* | 10/2010 | Ciolfi | G06F 8/34 | 703/22 |
| 7,810,077 B2* | 10/2010 | Bracha | G06F 8/315 | 717/118 |
| 7,823,121 B1* | 10/2010 | Zarrinkoub | G06F 8/34 | 715/763 |
| 7,941,303 B1 | 5/2011 | Raghavan et al. | | |
| 8,234,630 B2* | 7/2012 | Raghavan et al. | | 717/125 |
| 8,271,943 B2* | 9/2012 | Hudson, III | G06F 8/34 | 717/113 |
| 8,423,981 B2* | 4/2013 | Hudson, III | G06F 8/34 | 717/114 |
| 8,655,636 B2* | 2/2014 | Kumar | G06F 9/444 | 703/13 |
| 8,793,602 B2* | 7/2014 | Szpak | G06F 9/542 | 345/173 |
| 8,943,466 B2* | 1/2015 | Bray | G06F 8/34 | 717/106 |
| 2002/0170041 A1* | 11/2002 | Shann | | 717/141 |
| 2003/0046658 A1* | 3/2003 | Raghavan | G06F 8/34 | 717/106 |
| 2005/0096894 A1* | 5/2005 | Szpak | G06F 17/5009 | 703/13 |
| 2005/0160397 A1 | 7/2005 | Szpak et al. | | |
| 2005/0216248 A1* | 9/2005 | Ciolfi | G06F 17/5009 | 703/22 |
| 2006/0139587 A1* | 6/2006 | Rossing | G03F 7/70483 | 355/53 |
| 2007/0067761 A1* | 3/2007 | Ogilvie | G06F 8/34 | 717/146 |
| 2007/0261019 A1* | 11/2007 | Raghavan et al. | | 717/105 |
| 2008/0022259 A1* | 1/2008 | MacKlem | G06F 8/34 | 717/113 |
| 2008/0022264 A1* | 1/2008 | Macklem | G06F 8/34 | 717/136 |
| 2008/0127058 A1* | 5/2008 | Bray | G06F 8/34 | 717/106 |
| 2008/0270920 A1* | 10/2008 | Hudson | G06F 8/34 | 715/763 |
| 2009/0327942 A1* | 12/2009 | Eldridge | G06F 8/34 | 715/771 |
| 2010/0325617 A1* | 12/2010 | Hudson, III | G06F 8/34 | 717/140 |
| 2011/0320178 A1* | 12/2011 | Kumar | G06F 9/444 | 703/2 |
| 2014/0359560 A1* | 12/2014 | Avadhanula et al. | | 717/105 |
| 2014/0359561 A1* | 12/2014 | Avadhanula et al. | | 717/105 |
| 2014/0359566 A1* | 12/2014 | Avadhanula et al. | | 717/109 |
| 2014/0359567 A1* | 12/2014 | Avadhanula et al. | | 717/109 |
| 2014/0359568 A1* | 12/2014 | Avadhanula et al. | | 717/109 |
| 2014/0359569 A1* | 12/2014 | Avadhanula et al. | | 717/109 |
| 2015/0106781 A1* | 4/2015 | Adler et al. | G06F 9/444 | 703/13 |

OTHER PUBLICATIONS

The MathWorks, "Stateflow® 7, User's Guide", The MathWorks, Inc., Matlab and Simulink, © 1997-2011, 1509 pages.

* cited by examiner

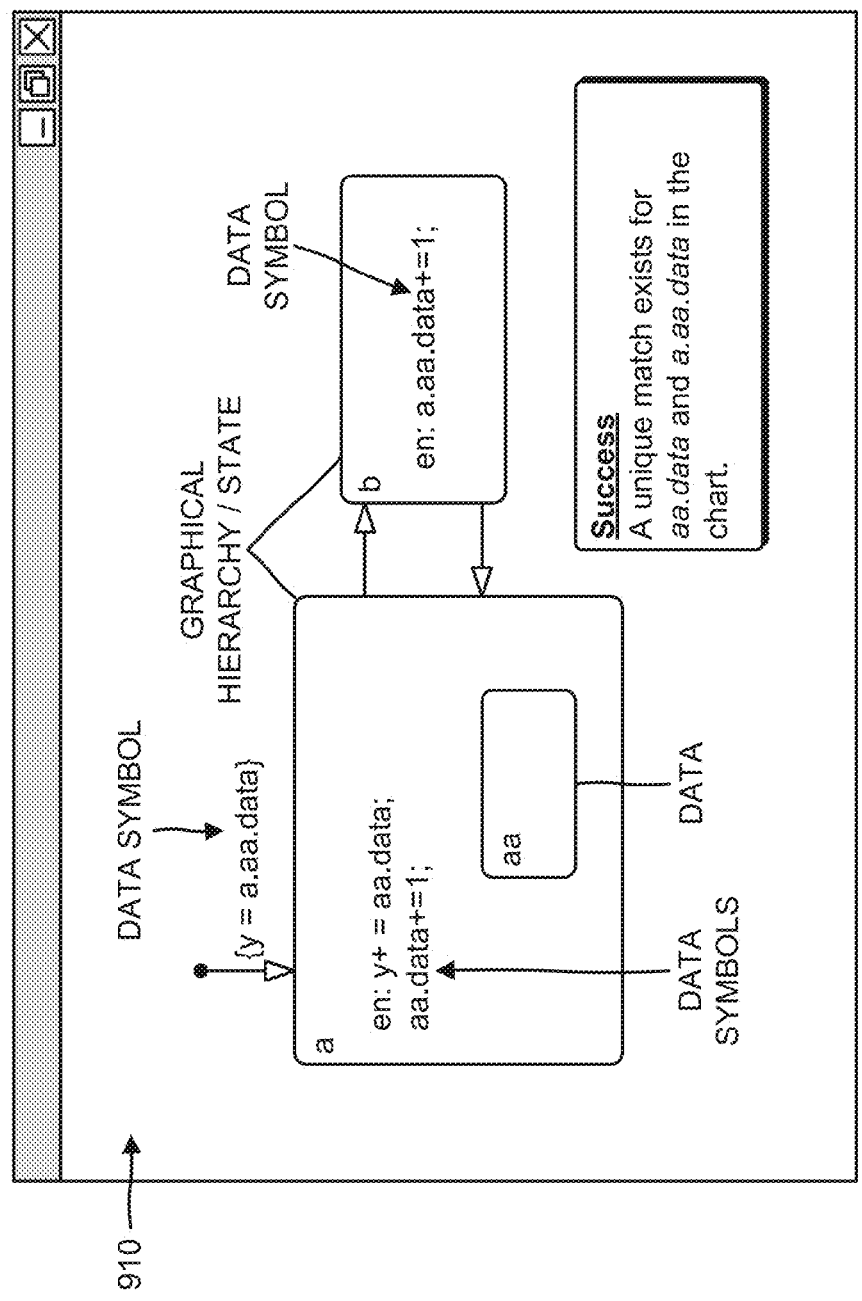

RESOLUTION OF TEXTUAL CODE IN A GRAPHICAL HIERARCHICAL MODEL OF A TECHNICAL COMPUTING ENVIRONMENT

RELATED APPLICATION

This application claims priority under 35 U.S.C. §119 based on U.S. Provisional Patent Application No. 61/827,863, filed May 28, 2013, the disclosure of which is incorporated by reference herein in its entirety.

BRIEF DESCRIPTION OF THE DRAWINGS

FIG. 6 is a flow chart of an example process for linking textual portions and graphical portions of a technical computing environment model;

FIGS. 9A-9E are diagrams of an example relating to the example process shown in FIG. 8.

DETAILED DESCRIPTION

The following detailed description of example implementations refers to the accompanying drawings. The same reference numbers in different drawings may identify the same or similar elements.

A technical computing environment (TCE) may include a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. The TCE may use an array, a vector, and/or a matrix as basic elements.

The TCE may provide a graphical environment for modeling and simulating combinatorial and sequential decision logic based on state machines and flow charts. The decision logic may enable users to combine graphical and tabular representations, including state transition diagrams, flow charts, state transition tables, and truth tables, to model how a system reacts to events, time-based conditions, and external input signals. The graphical environment may generate models, such as a textual model; a graphical model with one or more model elements (e.g., blocks), one or more input signals, and one or more output signals; a combination of a textual model and a graphical model; etc. The TCE may exist for creating computer-generated models, such as graphical behavioral models, that represent dynamic systems. A model may include a plurality of graphical objects, such as blocks or icons. A model may be executed to simulate the operation or behavior of the system being modeled. Executing the model may be referred to as simulating the model.

The TCE may provide a textual environment that includes a high-level language and an interactive environment for numerical computation, visualization, and programming. The textual environment may enable users to analyze data, develop algorithms, create models and applications, manipulate matrices, plot functions and data, implement algorithms, create user interfaces, and interface with programs written in other languages, including C, C++, Java, and Fortran. Unlike the graphical environment, which models how a system reacts to events and time-based conditions, the textual environment includes an imperative or declarative language with no concept of logical, model, physical, and/or simulation time and events.

Figure 1:
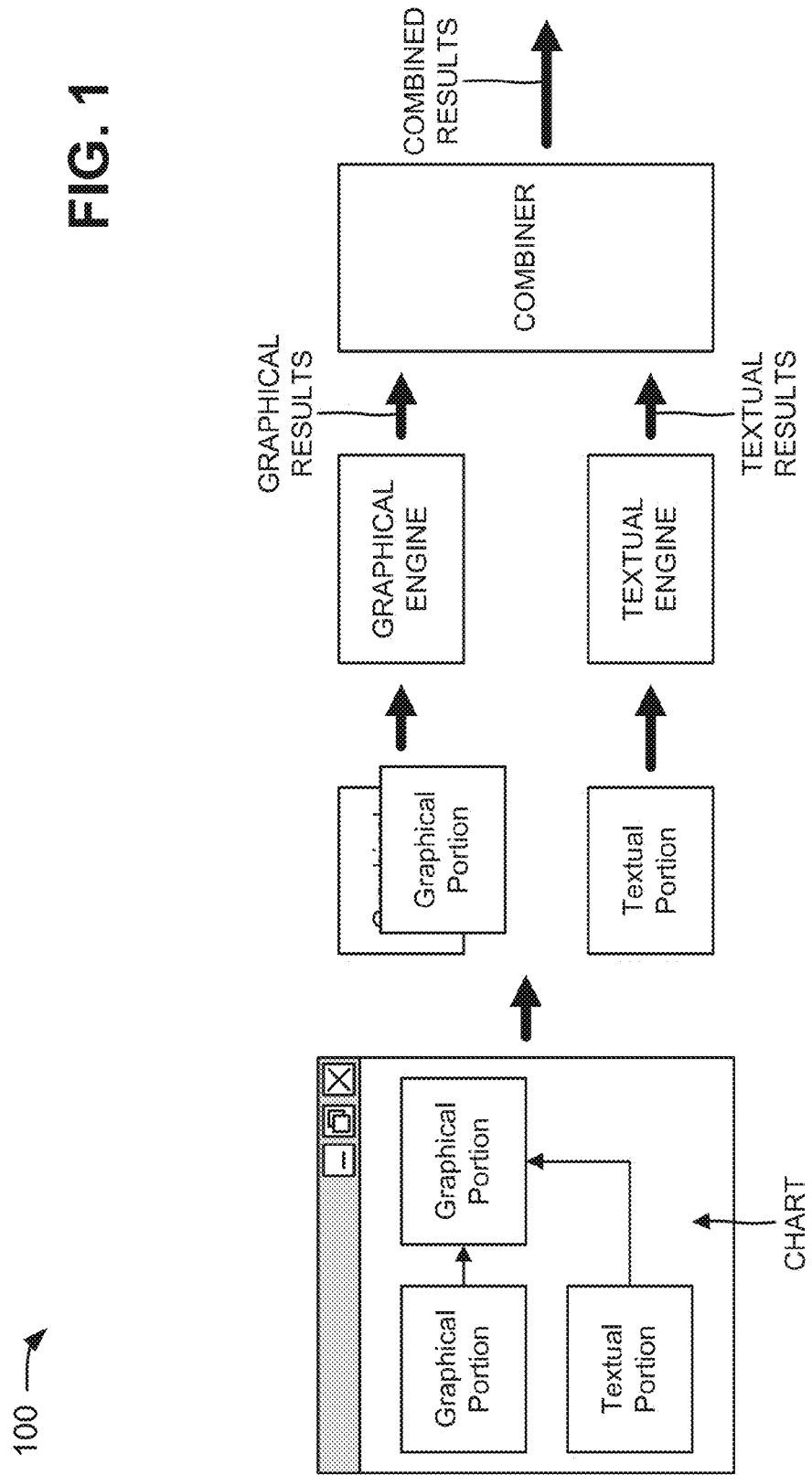
FIG. 1 is diagram of an overview of an example implementation described herein.

Conventional action languages for the graphical environment (e.g., Stateflow) consisted of statically-typed, scalar-based languages, such as, for example, C, C++, etc. FIG. 1 is a diagram of an overview of an example implementation 100 described herein. In some implementations, a graphical environment of the TCE may utilize a dynamically-typed and/or array-based language as an action language (e.g., the M language, a MATLAB® language, a MATLAB-compatible language, a MATLAB-like language, etc.). The dynamically-typed and/or array-based language may be understood by a textual environment of the TCE. In some implementations, the textual environment of the TCE may be provided in the graphical environment of the TCE. Time-based and event-based simulation may be introduced into the language of the textual environment, while maintaining the syntax and style of the language. In some implementations, the textual environment may include a well-defined textual resolution scheme for resolving unknown data symbols within a function or script. In some implementations, the textual resolution scheme of the textual environment may be enhanced so that textual code (e.g., a function, script, etc.) may refer to symbols within a graphical hierarchy, as defined by the graphical environment. In some implementations, the language of the textual environment may be enhanced to refer to a data or function symbol, which is parented by another state, by using a particular notation (e.g., a dot notation, such as "A.B.data" or "A.B.function").

With reference to FIG. 1, a user may utilize a TCE of a computing device to create a chart or a model that includes a chart. The chart may include a graphical hierarchy of state blocks that are created by a graphical environment of the TCE. One or more of the state blocks may include graphical symbols that are understood by the graphical environment. One or more of the state blocks may include textual code (e.g., functions, algorithms, etc.) and/or data that are understood by a textual environment of the TCE. As shown in FIG. 1, the chart may include a graphical portion (e.g., the state blocks, the graphical symbols, and the graphical hierarchy), understood by the graphical environment, and a textual portion (e.g., the textual code and the data), understood by the textual environment.

As further shown in FIG. 1, the TCE may parse the chart into the textual portion and the graphical portions. However, one of the graphical portions may not be understood by a graphical engine associated with the graphical environment. For example, one or more graphical symbols may not be understood by the graphical engine. In such situations, the TCE may transform the one graphical portion into a form that is understood by the textual engine.

The TCE may provide the untransformed graphical portions to the graphical engine, and may provide the transformed graphical portions and the textual portion to a textual engine associated with the textual environment. The graphical engine may process the untransformed graphical portions to generate graphical results, such as, for example, how a system reacts to events, time-based conditions, external input signals, etc. The textual engine may process the textual portion to generate textual results, such as, for example, data analysis results, function calculation results, array calculation results, etc. The graphical engine may provide the graphical results to a combiner associated with the TCE, and the textual engine may provide the textual results to the combiner. The combiner may combine the graphical results with the textual results to generate combined results that may be understood by the graphical environment and the textual environment. In some implementations, the combiner may link the textual code and/or the data to a corresponding graphical hierarchy (e.g., a state block) based on the graphical symbols. In some implementations, the combiner may correspond to the graphical engine or the textual engine.

Such an arrangement may enable a user of the TCE to utilize time-based and event-based simulation from the graphical environment in the textual environment. This may enable the user to naturally draw a model where the actual hierarchy of the model is encoded in the textual environment. The arrangement may also enable the user to utilize the features of the textual environment (e.g., analyze data, develop algorithms, manipulate matrices, perform calculations, etc.) with the features of the graphical environment (e.g., simulating combinatorial and sequential decision logic based on state machines and flow charts).

Figure 2:
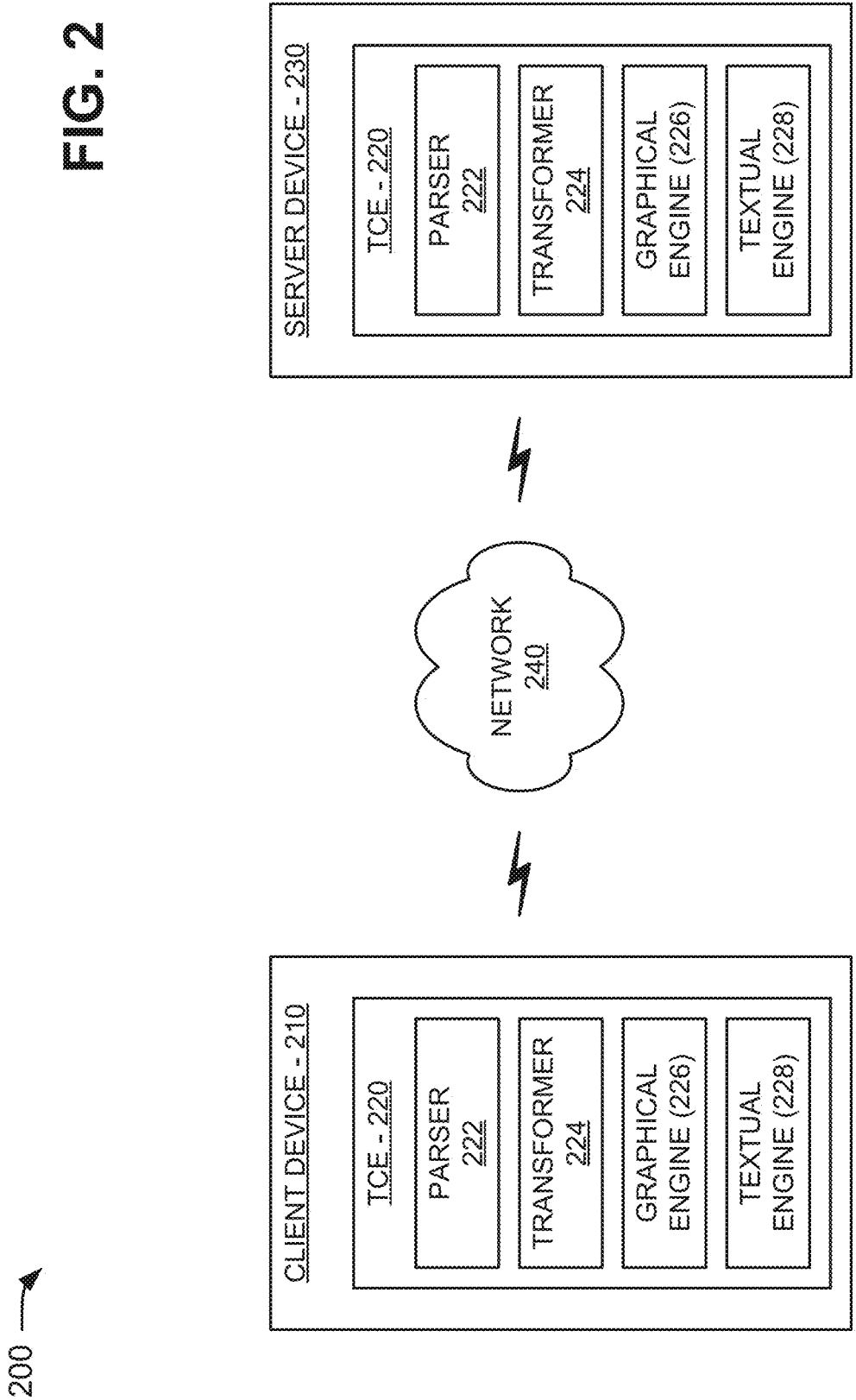
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include a device capable of receiving, generating, storing, processing, executing, and/or providing information in a manner described herein. For example, client device 210 may include a computing device, such as a desktop computer, a laptop computer, a tablet computer, a handheld computer, a server, a mobile phone (e.g., a smart phone, a radiotelephone, etc.), or a similar device. In some implementations, client device 210 may receive information from and/or transmit information to server device 230.

TCE 220 may be provided within a computer-readable medium of client device 210. Alternatively, or additionally, TCE 220 may be provided in another device (e.g., server device 230) that is accessible by client device 210. TCE 220 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, TCE 220 may include a dynamically-typed programming language (e.g., the M language, a MATLAB® language, a MATLAB-compatible language, a MATLAB-like language, etc.) that can be used to express problems and/or solutions in mathematical notations. A model may be declarative in that the model may not allow the user to explicitly specify when a state of a machine that the model is executing on changes. In a declarative model, the user may not explicitly specify an order in which state changes in the model. In an imperative model, the user may explicitly specify when a particular state may change (e.g., relative to other state changes).

For example, TCE 220 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 220 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 220 may further provide mathematical functions and/or graphical tools (e.g., for creating plots, surfaces, images, volumetric representations, etc.). In some implementations, TCE 220 may provide these functions and/or tools using toolboxes (e.g., toolboxes for signal processing, image processing, data plotting, parallel processing, etc.). In some implementations, TCE 220 may provide these functions as block sets or in another way, such as via a library, etc.

TCE 220 may be implemented as a text-based environment (e.g., MATLAB software; Octave; Python; JavaScript; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dassault Systemes; etc.); and a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dassault Systemes; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.). In some implementations, TCE 220 may include a hybrid environment that includes one or more of the above-referenced text-based environments and one or more of the above-referenced graphically-based environments.

TCE 220 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:
A='hello'
A=int32([1, 2])
A=[1.1, 2.2, 3.3].

Now suppose the program is executed, for example, in a TCE, such as TCE 220. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 220 may provide mathematical routines and a high-level programming language suitable for non-professional programmers and may provide graphical tools that may be used for creating plots, surfaces, images, volumetric representations, or other representations. TCE 220 may provide these routines and/or tools using toolboxes (e.g., toolboxes for signal processing, image processing, data plotting, parallel processing, etc.). TCE 220 may also provide these routines in other ways, such as, for example, via a library, local or remote database (e.g., a database operating in a computing cloud), remote procedure calls (RPCs), and/or an application programming interface (API). TCE 220 may be configured to improve runtime performance when performing computing operations. For example, TCE 220 may include a just-in-time (JIT) compiler.

In some implementations, TCE 220 may provide a graphical environment for modeling and simulating combinatorial and sequential decision logic based on state machines and flow charts. The decision logic may enable users to combine graphical and tabular representations, including state transition diagrams, flow charts, state transition tables, and truth tables, to model how a system reacts to events, time-based conditions, and external input signals. The graphical environment may generate models, such as a textual model; a graphical model with one or more model elements (e.g., blocks), one or more input signals, and one or more output signals; a combination of a textual model and a graphical model; etc.

In some implementations, TCE 220 may provide a textual environment that includes a high-level language and an interactive environment for numerical computation, visualization, and programming. The textual environment may enable users to analyze data, develop algorithms, create models and applications, manipulate matrices, plot functions and data, implement algorithms, create user interfaces, and interface with programs written in other languages, including C, C++, Java, and Fortran. Unlike the graphical environment, which models how a system reacts to events and time-based conditions, the textual environment may include an assignment-based, imperative language with no concept of logical, model, physical, and/or simulation time and events.

In some implementations, and as further shown in FIG. 2, TCE 220 may include a parser 222, a transformer 224, a graphical engine 226, and a textual engine 228. Parser 222 may include a component that parses TCE code (e.g., a model or a chart) into a graphical portion and a textual portion. The graphical portion may include information associated with a graphical hierarchy, graphical symbols, etc. of the TCE code. The textual portion may include information associated with textual code of the TCE code that may be understood by textual engine 228. In some implementations, parser 222 may parse the textual portion into two or more portions (e.g., a time-based portion and an output portion), and may parse the graphical portion into two or more portions (e.g., a functional portion and a non-functional portion). In some implementations, parser 222 may parse TCE code into other types of portions.

Transformer 224 may include a component that receives the graphical portion of the TCE code that is not understood by graphical engine 226. For example, one or more graphical symbols may not be understood by graphical engine 226 and may be provided to transformer 224. Transformer 224 may transform the received graphical portion into a form that is understood by graphical engine 226.

Graphical engine 226 may receive the transformed graphical portion and the graphical portion that did not need to be transformed, and may process the received information. The processing of the received information may include generating graphical results, such as, for example, how a system reacts to events, time-based conditions, and external input signals. In some implementations, graphical engine 226 may include Simulink® software, Stateflow® software, Simscape™ software, and/or SimEvents® software.

Textual engine 228 may receive the textual portion, and may process the textual portion to generate textual results, such as, for example, data analysis results, matrix calculation results, array calculation results, etc. Graphical engine 226 may combine the graphical results with the textual results to generate combined results that may be understood by the graphical environment and the textual environment. In some implementations, textual engine 228 may include MATLAB software.

Server device 230 may include one or more devices capable of receiving, generating, storing, processing, executing, and/or providing information in a manner described herein. For example, server device 230 may include a computing device, such as a server, a desktop computer, a laptop computer, a tablet computer, a handheld computer, or a similar device. In some implementations, server device 230 may host TCE 220.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
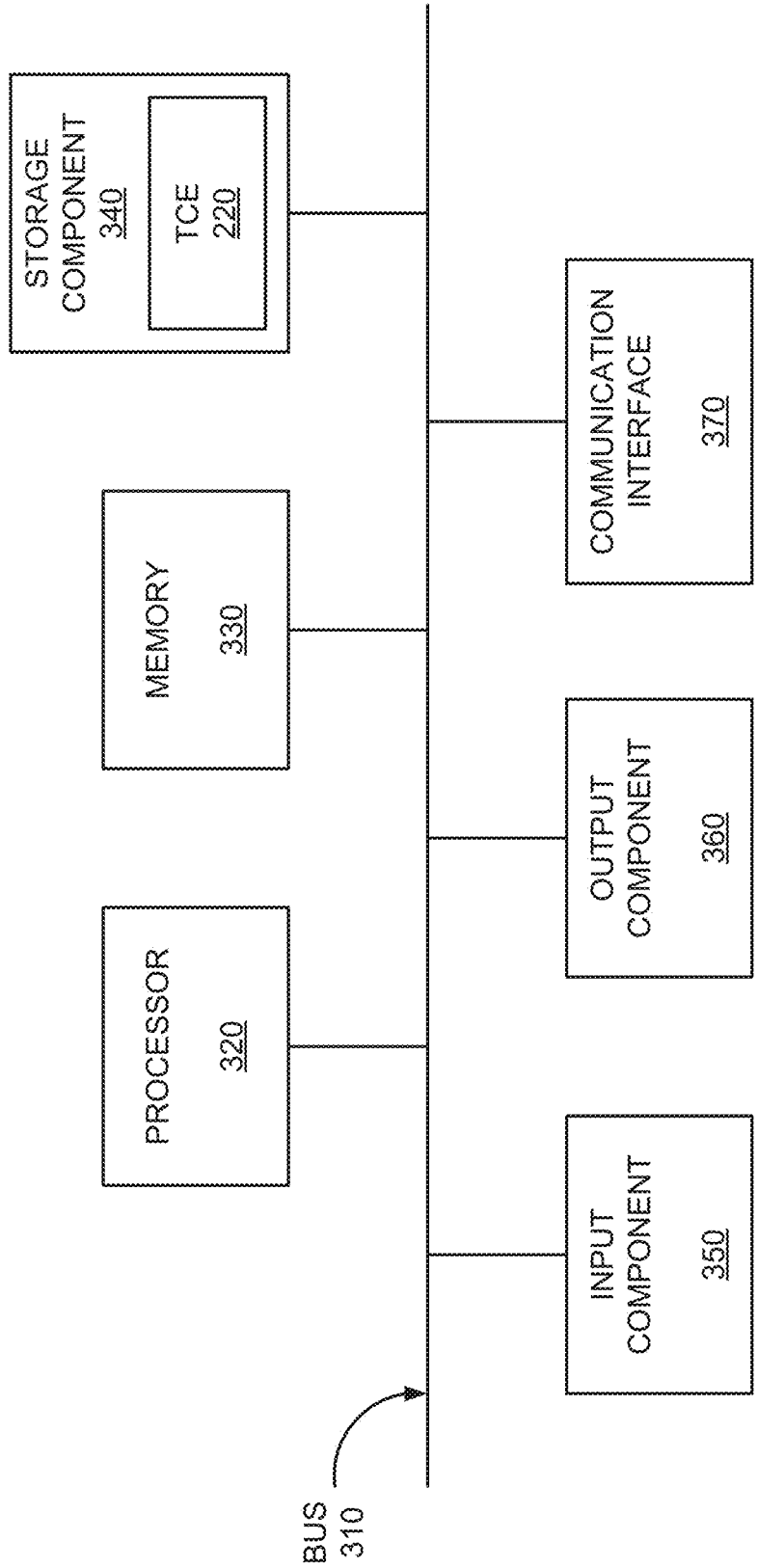
FIG. 3 is a diagram of example components of one or more devices of FIG. 2.

FIG. 3 is a diagram of example components of a device 300, which may correspond to client device 210 and/or server device 230. In some implementations, each of client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
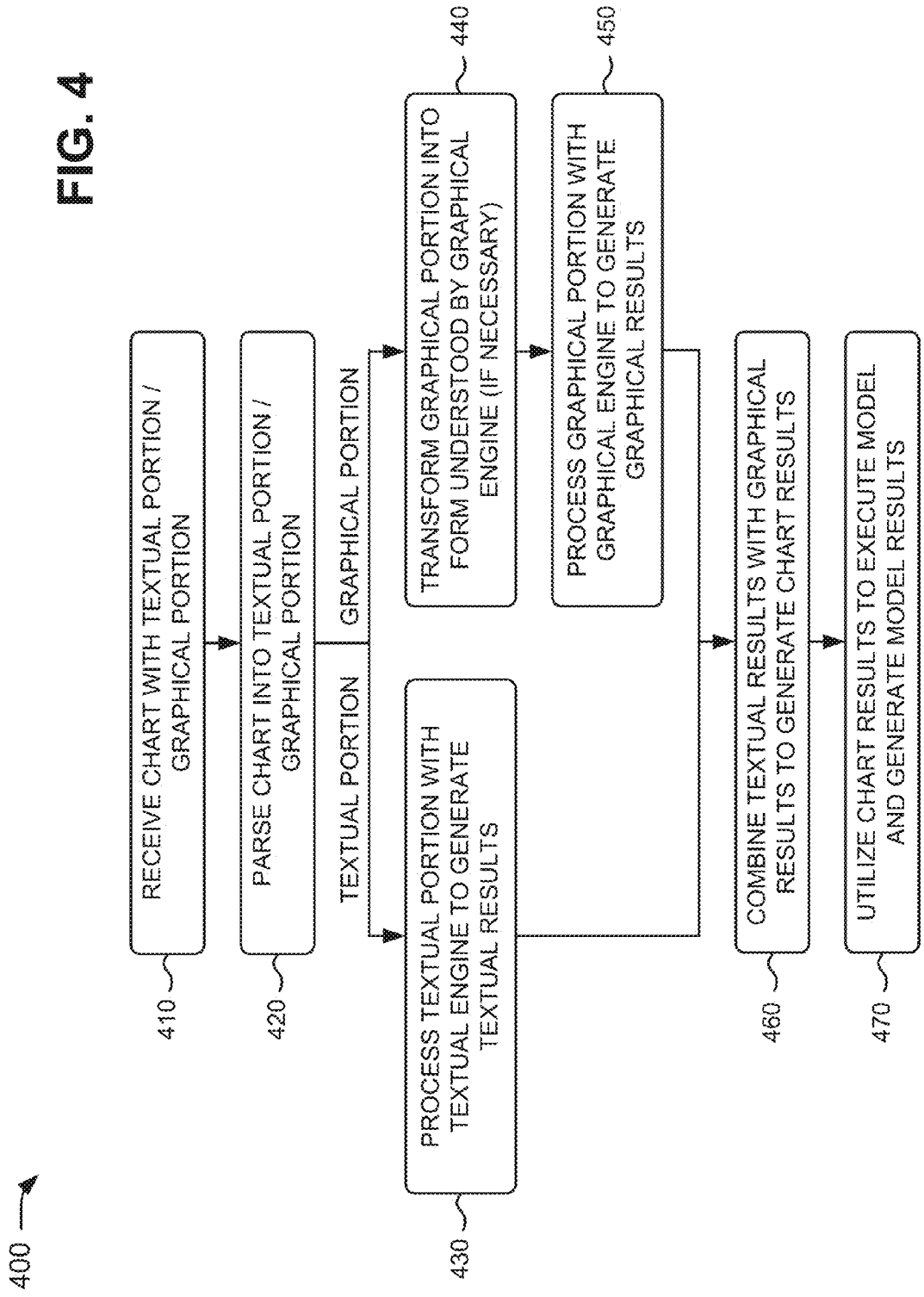
FIG. 4 is a flow chart of an example process for processing textual and graphical portions of a technical computing environment chart.

FIG. 4 is a flow chart of an example process 400 for processing textual and graphical portions of a technical computing environment chart. In some implementations, one or more process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include receiving a chart with a textual portion and a graphical portion (block 410). For example, TCE 220 may enable a user of client device 210 to create a model or to instruct client device 210 to receive the model from another source (e.g., server device 230, a CD-ROM, a flash memory, etc.). In some implementations, the model may include a chart with a graphical hierarchy of one or more chart elements (e.g., areas or regions associated with one or more states, referred to herein as "state blocks"), one or more input signals, and one or more output signals. For example, assume that a chart has state blocks A, B, and C, and that state block A includes state block B and a transition to state block C. An arrangement that includes a state block containing one or more state blocks and/or transitions to one or more state blocks may be referred to as a graphical hierarchy. Each of the chart elements may correspond to a status of a physical device, a subsystem, a model, etc. of a system being modeled (e.g., chart elements may behavioral so that a state may correspond to a status of a device, a subsystem, etc.).

In some implementations, the chart may include graphical symbols, transitions, and/or state transitions associated with the state blocks of the chart. The graphical symbols may include, for example, textual information that provides event-based conditions, time-based conditions, invariants, etc. to the state blocks, transitions, junctions, etc. In some implementations, one or more of the state blocks, transitions, and/or state transitions, may include textual code that may be understood and processed by textual engine 228 of TCE 220. The textual code may include, for example, one or more functions, matrices, data, etc. that may be understood and processed by textual engine 228.

In some implementations, TCE 220 may cause client device 210 to display a user interface so that the user may create and/or view the model and the chart. For example, the user may utilize the user interface to create the state blocks for the chart, and to connect the state blocks together. The user may associate the graphical symbols with the state blocks and/or other elements of the chart (e.g., transitions, state transitions, junctions, etc.), and may add the textual code in the one or more state blocks. The user may utilize the user interface to provide the chart within the model.

As further shown in FIG. 4, process 400 may include parsing the chart into a textual portion and a graphical portion (block 420). For example, parser 222 of TCE 220 may receive information associated with the chart, and may identify, based on the information, a portion of the chart that may be understood and processed by textual engine 228 (e.g., a textual portion) and a portion of the chart that may be understood and processed by graphical engine 226 (e.g., a graphical portion). In some implementations, parser 222 may have access to a data structure (e.g., a database) that stores syntax associated with the language of the textual environment of TCE 220 (e.g., and understood by textual engine 228). Parser 222 may compare the chart information with the syntax stored in the data structure, and may determine that particular portions of the chart information match the syntax. Parser 222 may designate the matching portions of the chart information as the textual portion. For example, parser 222 may designate functions, arrays, matrices, algorithms, etc. in the chart as the textual portion.

In some implementations, parser 222 may have access to a data structure (e.g., a database) that stores information associated with the graphical environment of TCE 220 (e.g., and understood by graphical engine 226). Parser 222 may compare the chart information with information stored in the data structure, and may determine that particular portions of the chart information match the information in the data structure. Parser 222 may designate the matching portions of the chart information as the graphical portion. For example, parser 222 may designate time-based conditions, event-based conditions, other conditions, hierarchy information, etc. as the graphical portion.

As further shown in FIG. 4, for the textual portion (block 420—TEXTUAL PORTION), process 400 may include processing the textual portion with the textual engine to generate textual results (block 430). For example, parser 222 may provide the textual portion of the chart to textual engine 228, and textual engine 228 may process the textual portion of the chart to generate textual results. In some implementations, textual engine 228 may execute the textual portion of the chart to generate the textual results. For example, assume that the textual portion of the chart includes a function for performing matrix calculations on data. In such an example, textual engine 228 may execute the function so that the matrix calculations are performed on the data. The matrix resulting from the calculations may be referred to as textual results. In another example, assume that the textual portion of the chart includes an algorithm for performing data analysis. In this example, textual engine 228 may execute the algorithm so that the data analysis is performed. The results of the data analysis may be referred to as textual results.

As further shown in FIG. 4, for the graphical portion (block 420—GRAPHICAL PORTION), process 400 may include transforming, if necessary, the graphical portion into a form understood by the graphical engine (block 440). For example, parser 222 may determine whether any of the graphical portion of the chart will not be understood by graphical engine 226. In some implementations, parser 222 may identify text in the graphical portion that may not be understood by graphical engine 226. For example, assume that the graphical portion includes the text before(abs(a*eig(b(1:10, 1:10))), sec), and that graphical engine 226 does not understand the text since graphical engine 226 needs to calculate a time to execute the text. In this example, parser 222 may provide the text to transformer 224, and transformer 224 may transform the text into a form understood by graphical engine 226. For example, transformer 224 may transform the text to utilize counters maintained by the graphical environment (e.g., Simulink) so that a time (e.g., one second, two seconds, etc.) may be calculated by graphical engine 226. In some implementations, transformer 224 may provide the transformed text to graphical engine 226 for processing. In some implementations, the text provided in the graphical portion may include textual operations (e.g., after(abs(a*eig(b(1:10, 1:10))), sec)) that are understood by the textual environment, such as, for example, TCE operations.

In some implementations, parser 222 may provide the remaining graphical portion (e.g., which may be understood by graphical engine 226) directly to graphical engine 226. In some implementations, parser 222 may determine that all of the graphical portion may be understood by graphical engine 226. In such a situation, parser 222 may provide the entire graphical portion to graphical engine 226 and transformer 224 may not be utilized.

As further shown in FIG. 4, for the graphical portion (block 420—GRAPHICAL PORTION), process 400 may include processing the graphical portion with the graphical engine to generate graphical results (block 450). For example, parser 222 may provide, to graphical engine 226, the graphical portion of the chart that is understood by graphical engine 226. Transformer 224 may provide, to graphical engine 226, any of the graphical portion that has been transformed into a form that is understood by graphical engine 226. Graphical engine 226 may process the graphical portion of the chart to generate graphical results. In some implementations, graphical engine 226 may execute the graphical portion of the chart to generate the graphical results. For example, assume that the graphical portion of the chart includes instructions to combine graphical and tabular representations. In such an example, graphical engine 226 may execute the instructions so that the graphical and tabular representations are combined. The resulting combination may be referred to as graphical results. In another example, assume that the graphical portion of the chart includes an event-based condition (e.g., transition to state block A when a function is calculated). In this example, graphical engine 226 may execute the event-based condition so that state block A is transitioned to. The results of the execution of the event-based condition may be referred to as graphical results. In some implementations, graphical engine 226 may execute textual information.

As further shown in FIG. 4, process 400 may include combining the textual results with the graphical results to generate chart results (block 460). For example, TCE 220 may combine the textual results, generated by textual engine 228, with the graphical results generated by graphical engine 226 to generate chart results. In some implementations, the chart results may include results associated with execution of the chart. For example, assume that the textual results include a calculation of a function bar and that the graphical results include utilizing the calculation when a state block B is transitioned to. In such an example, the chart results may include transitioning to state block B and utilizing the calculation of the function bar. In another example, assume that the textual results include performing a matrix calculation and that the graphical results include computing the time period based on the array-based computations. In such an example, the chart results may include determining when the time period has expired and utilizing the matrix calculation after the time period has expired and/or utilizing the matrix calculation to determine the time period. In some implementations, the chart may model reactive systems via state machines and flow charts within a model. In some implementations, the chart may use a variant of a finite-state machine notation, which may enable representation of hierarchy, parallelism, event broadcast, and/or history within the chart. In some implementations, the chart may provide state transition tables and/or truth tables. In some implementations, the chart may represent discrete modes of a system by a state, may control how a system responds to faults and failures within the system, and may schedule when specific tasks occur (e.g., either within the chart or within an overall model).

As further shown in FIG. 4, process 400 may include utilizing the chart results to execute the model and generate model results (block 470). For example, TCE 220 may utilize the chart results in the model (e.g., during execution of the model) to generate model results. In some implementations, the model results may include results associated with execution of the model based on the chart results. For example, assume that the chart results include transitioning to state block B and utilizing a calculation of a function bar. After state block B is transitioned to and the function bar is calculated, TCE 220 may utilize the function calculation in the model to generate the model results. In another example, assume that the chart results include determining when a time period has expired and utilizing the computations to determine the time period. After the matrix calculation is performed, TCE 220 may utilize the matrix calculation in the model to generate the model results and/or to determine the time period.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
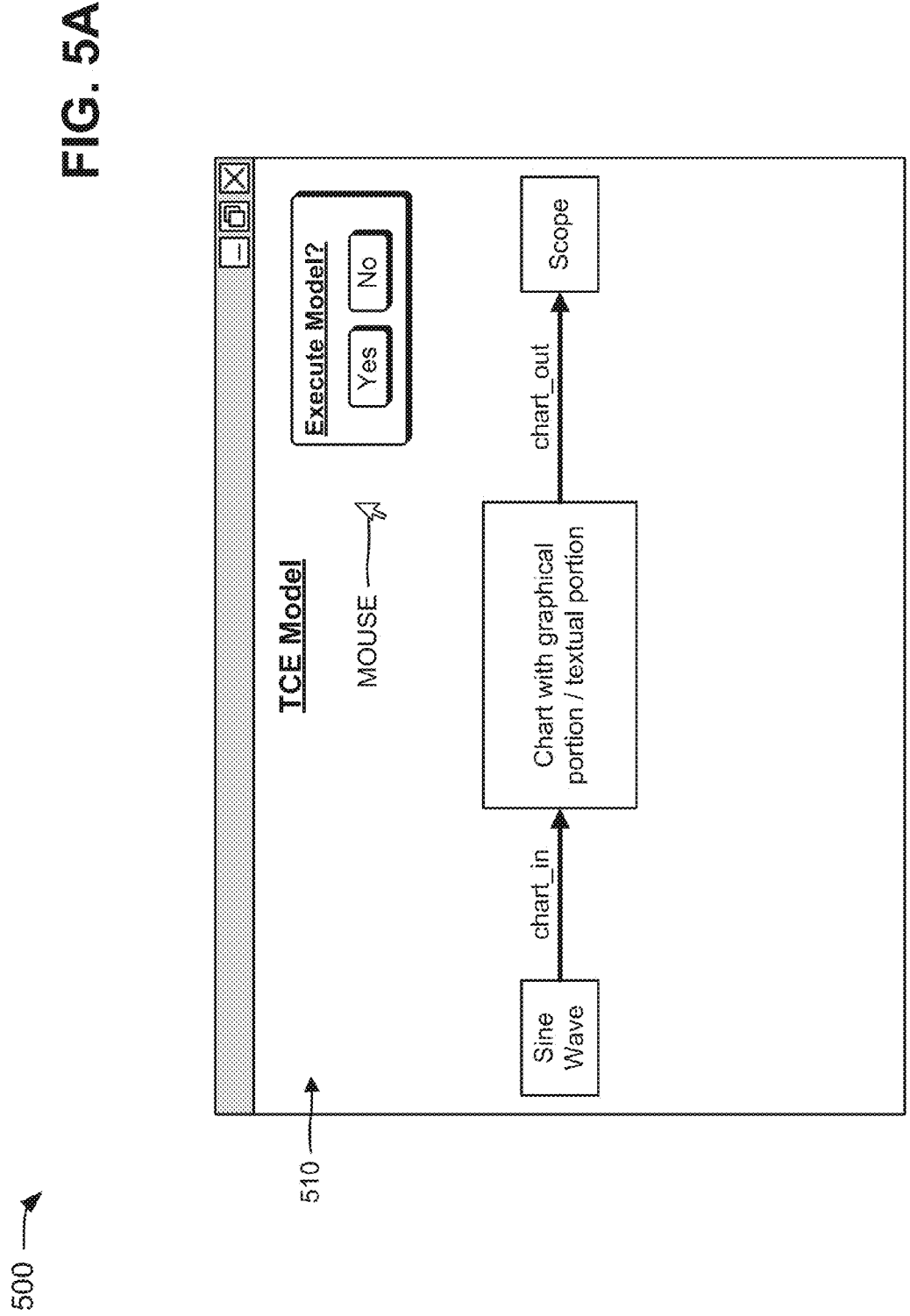
FIGS. 5A-5E are diagrams of an example relating to the example process shown in FIG. 4.

FIGS. 5A-5E are diagrams of an example 500 relating to example process 400 shown in FIG. 4. In example 500, assume that a user of client device 210 utilizes TCE 220 to create a model or to import the model into TCE 220. As shown in FIG. 5A, TCE 220 may cause client device 210 to display the model in a user interface 510. The model may include a sine wave block, a chart block, and a scope block.

The sine wave block may include a representation of a sine wave that is to be displayed by the scope block. In example 500, assume that the sine wave block provides a chart_in signal (e.g., a sine wave signal) to the chart block. The chart block may include a representation of a chart that processes the sine wave signal so that it may be understood by the scope block. The chart block may include a graphical portion and a textual portion. The chart block may receive the chart_in signal, and may process the chart_in signal to produce a chart_out signal (e.g., a voltage/time signal to be displayed by the scope block). The chart block may provide the chart_out signal to the scope block. The scope block may include a representation of an oscilloscope that displays constantly varying signal voltages as a function of time. The scope block may receive the chart_out signal, and may display the signal (e.g., a voltage/time signal). In some implementations, the chart block may include a chart (FIG. 5B) that may be executed based on different execution semantics provided by a user and/or inferred from the model. The execution semantics may include dynamic notions associated with continuous time for example, computing the time derivatives of a dynamic system based on matrix calculations, etc. In some implementations, the chart may be provided in an environment that includes multiple domains.

As further shown in FIG. 5A, TCE 220 may instruct client device 210 to display an option to execute the model. For example, user interface 510 may display a window or some other display mechanism that requests whether the user wants to execute the model. If the user elects to execute the model (e.g., via selection of a "Yes" button with a mouse or other selection mechanism), TCE 220 may execute the model. In some implementations, the user may select a "Play" button with the mouse, and TCE 220 may execute the model. In order to execute the model, assume that TCE 220 needs to execute the chart block, as shown in a user interface 520 of FIG. 5B. In some implementations, the model may include computational semantics associated with graphical and textual elements, and may include computational semantics associated with various blocks in the model. In some implementations, TCE 220 may debug the model before or during execution of the model or generation of code.

As shown in user interface 520, the chart may include a graphical hierarchy of state blocks A, B, C, and D. The graphical hierarchy may include the arrangement of the state blocks in the chart. For example, state block A may be transitioned to first, state block B may be transitioned to second, state block C may be transitioned to third, and state block D may be transitioned to last. The state blocks may include state information provided by graphical symbols. For example, state block A may include the graphical symbols en: a_data=3 and du: u_buffer=[chart_in; u_buffer(1:end−1)] (e.g., which may be parsed by graphical engine 226 into a portion "du" that may be understood by graphical engine 226 and another portion "u_buffer=[chart_in; u_buffer(1:end−1)]" that may be understood by textual engine 228); state block B may include the graphical symbols en: chart_out=a_data; state block C may include the graphical symbols en: foo( ) and state block D may include the graphical symbols en: chart_out=data. Some or all of the graphical hierarchy, state blocks A, B, C, and D, and the graphical symbols may be understood by graphical engine 226. State block A may also include textual code (e.g., a function foo) that may be understood by textual engine 228. In some implementations, the textual code may include text for a function (e.g., foo, bar, etc.), text for a matrix (e.g., C=[1, 2, 3]), array-based text, dynamically-typed text, dynamic assignments, script or function name spaces, etc. (e.g., text that ignores certain output arguments, a function with logic that involves a caller's number of output arguments, fixed point quantities that use integer containers to specify approximate floating point values). In some implementations, graphical engine 226 may execute graphical code and textual code (e.g., C code), but may not execute dynamically-typed and/or array-based code. In some implementations, textual engine 228 may execute the dynamically-typed, array-based code.

Figure 5B:
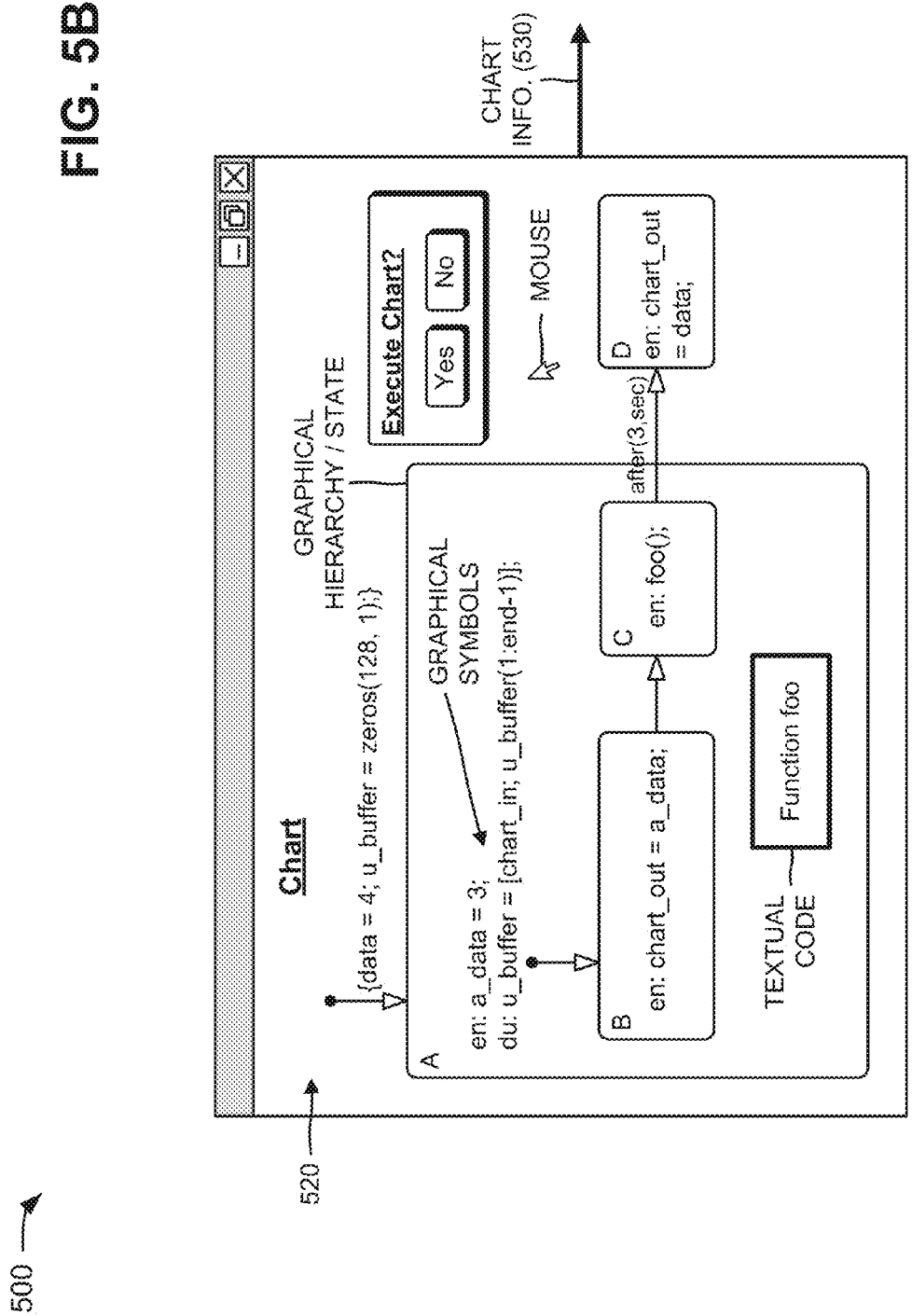

As further shown in FIG. 5B, when the chart wakes up, the default transitions of the chart may be executed. For example, an action in a default transition (e.g., [data=4; u_buffer=zeros (128, 1);]) may be executed, and state block A may be marked as active. Graphical symbols of state block A (e.g., an entry action en: a_data=3) may be executed, and default transitions inside state block A may be executed to establish an active child of state block A (e.g., mark state block B as active). Graphical symbols of state block B (e.g., an entry action en: chart_out=a_data) may be executed, and the chart execution may be complete (e.g., the chart may go to sleep) since no child states remain. When the chart sleeps, state blocks A and B may be active. A next time the chart wakes up, graphical symbols of state block A (e.g., the during action du: u_buffer= [chart_in; u_buffer(1:end−1)]) may be executed since there are no direct outer transitions of state block A. Outer transitions of state block B may be checked, and, since there is no condition, the transition to state block C may be assumed to be true. Therefore, the chart may transition from state block B to state block C. State block C may become active and state block A may remain active. The chart may keep waking up according to solver settings and/or system dynamics, and may wake up many times or a few times. Every time the chart wakes up, the outer transitions of all active state blocks may be checked, for example, in a top-down manner. If an outer transition of a particular state block is not true, a during action of the particular state block may be executed. Otherwise, a transition may occur to a next state block. This may result in one or more executions of the during action of state block A (e.g., du: u_buffer=[chart_in; u_buffer(1:end−1)]).

At some point, the chart may wake up, with a condition specified in an outer transition of state block C (e.g., after(3, sec)) being true, after state block C is first entered. When this condition is true, a transition from state block C may occur. State block C may be marked as inactive when state block C is exited. State block A may be marked as inactive since the outer transition of state block C (e.g., after(3, sec)) leaves a graphical boundary of state block A. State block C may transition to state block D, and state block D may be marked as active. At this time, only state block D may be active in the chart. Graphical symbols of state block D (e.g., an entry action en: chart_out=data) may be executed at this time.

As further shown in FIG. 5B, TCE 220 may instruct client device 210 to display an option to execute the chart or may automatically execute the chart when the model is executed. For example, user interface 520 may display a window or some other display mechanism that requests whether the user wants to execute the chart. If the user elects to execute the chart (e.g., via selection of a "Yes" button with a mouse or other selection mechanism), TCE 220 may execute the chart to generate chart information 530, as further shown in FIG. 5B. Chart information 530 may include information associated with the graphical hierarchy, state blocks A, B, C, and D, the graphical symbols, the textual code, and/or execution of the graphical hierarchy, state blocks A, B, C, and D, the graphical symbols, and/or the textual code. In some implementations, the chart may be executed based on conditions in a model (e.g., a time-based block diagram model). For example, if a temperature in a model of an HVAC system exceeds a certain value (e.g., at a particular time), a status of a heater device may change from on to off.

In some implementations, TCE 220 may begin searching at a lowest level of the graphical hierarchy for data and/or a function and move up the graphical hierarchy level by level until the data/function is found. In some implementations, TCE 220 may include a global or logical workspace that may be searched first or last, for example, for data and/or a function. In some implementations, TCE 220 may execute the chart by executing one or more transitions, by executing in microsteps, by executing all events and actions at a hierarchical level, etc. Each microstep may result in a set of transitions that result in a stable state configuration (e.g., the result of one state chart execution). A state machine may continue to execute microsteps until no state transitions are possible from a current state configuration.

Figure 5C:
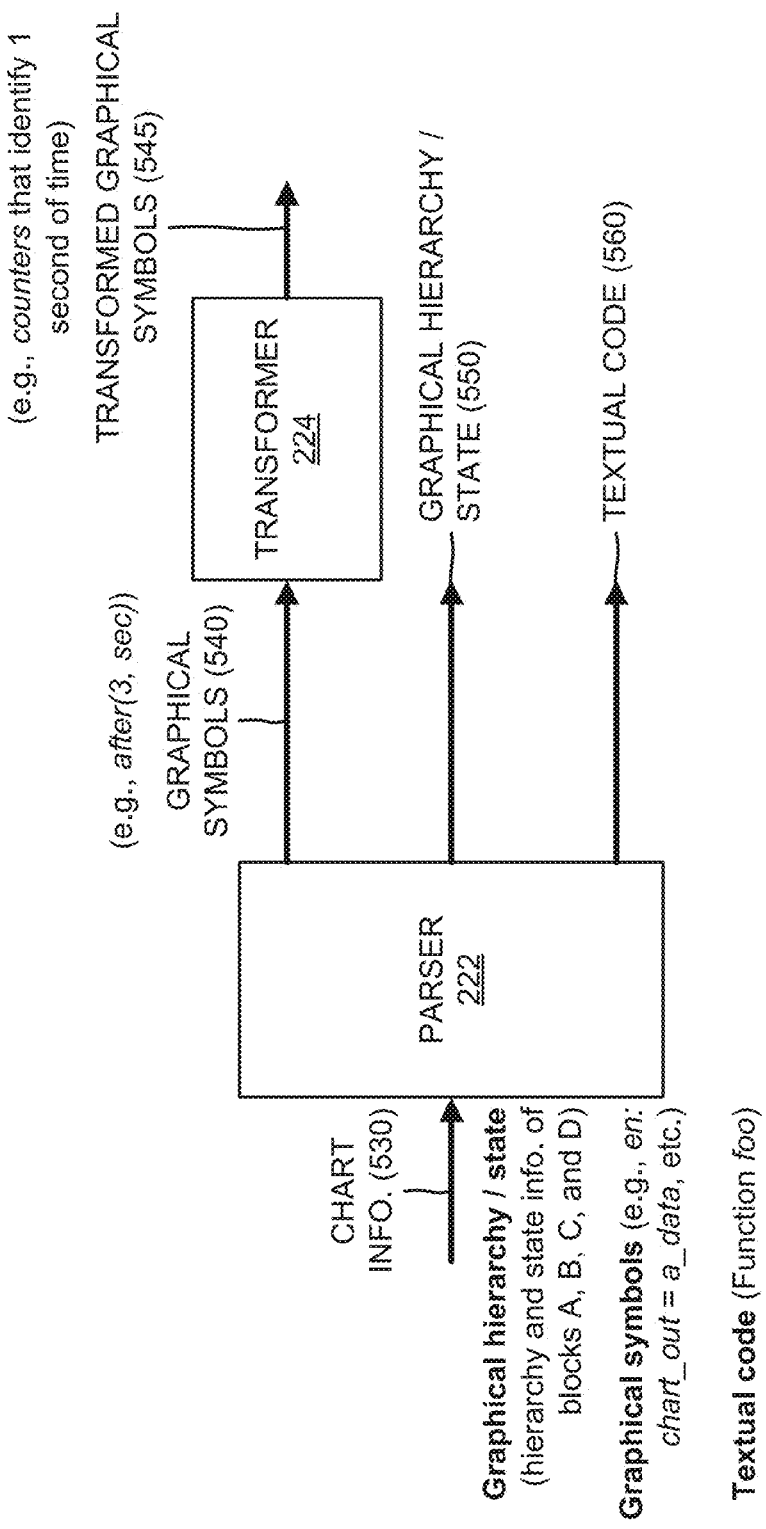

As shown in FIG. 5C, assume that TCE 220 provides chart information 530 to parser 222. For example, TCE 220 may provide, to parser 222, the information associated with the graphical hierarchy and the state of the chart (e.g., the hierarchy and active state information of state blocks A, B, C, and D); the information associated with the graphical symbols (e.g., chart_out=data, after(3, sec), etc.); the information associated with the textual code (e.g., the function foo); and/or the execution of the graphical hierarchy, state blocks A, B, C, and D, the graphical symbols, and/or the textual code. Parser 222 may parse chart information 530 into information 540 associated with graphical symbols that are not understood by graphical engine 226; information 550 associated with the graphical hierarchy and state blocks A, B, C, and D; and information 560 associated with the textual code.

Information 540 may not be generated if all of the graphical symbols, in chart information 530, are understood by graphical engine 226. In such a situation, parser 222 may provide information 540 associated with the graphical symbols directly to graphical engine 226. In one example, information 540 may include the text after(3, sec) or after(abs(a*eig(b(1: 10, 1:10))), sec), which may not be understood by graphical engine 226 since graphical engine 226 does not understand TCE language syntax (e.g., abs(a*eig(b))). In this example, parser 222 may provide the text to transformer 224, and transformer 224 may transform the text into a form understood by graphical engine 226 (e.g., transformed graphical symbols 545, as shown in FIG. 5C). For example, transformer 224 may transform the text to utilize counters maintained by the graphical environment (e.g., Simulink) so that a time (e.g., one second, two seconds, etc.) may be calculated by graphical engine 226. Information 550 associated with the graphical hierarchy and state blocks A, B, C, and D may include, for example, the hierarchy and state information of state blocks A, B, C, and D, information identifying that state A is a parent state for state B, etc. Information 560 associated with the textual code may include, for example, information associated with the function foo.

Figure 5D:
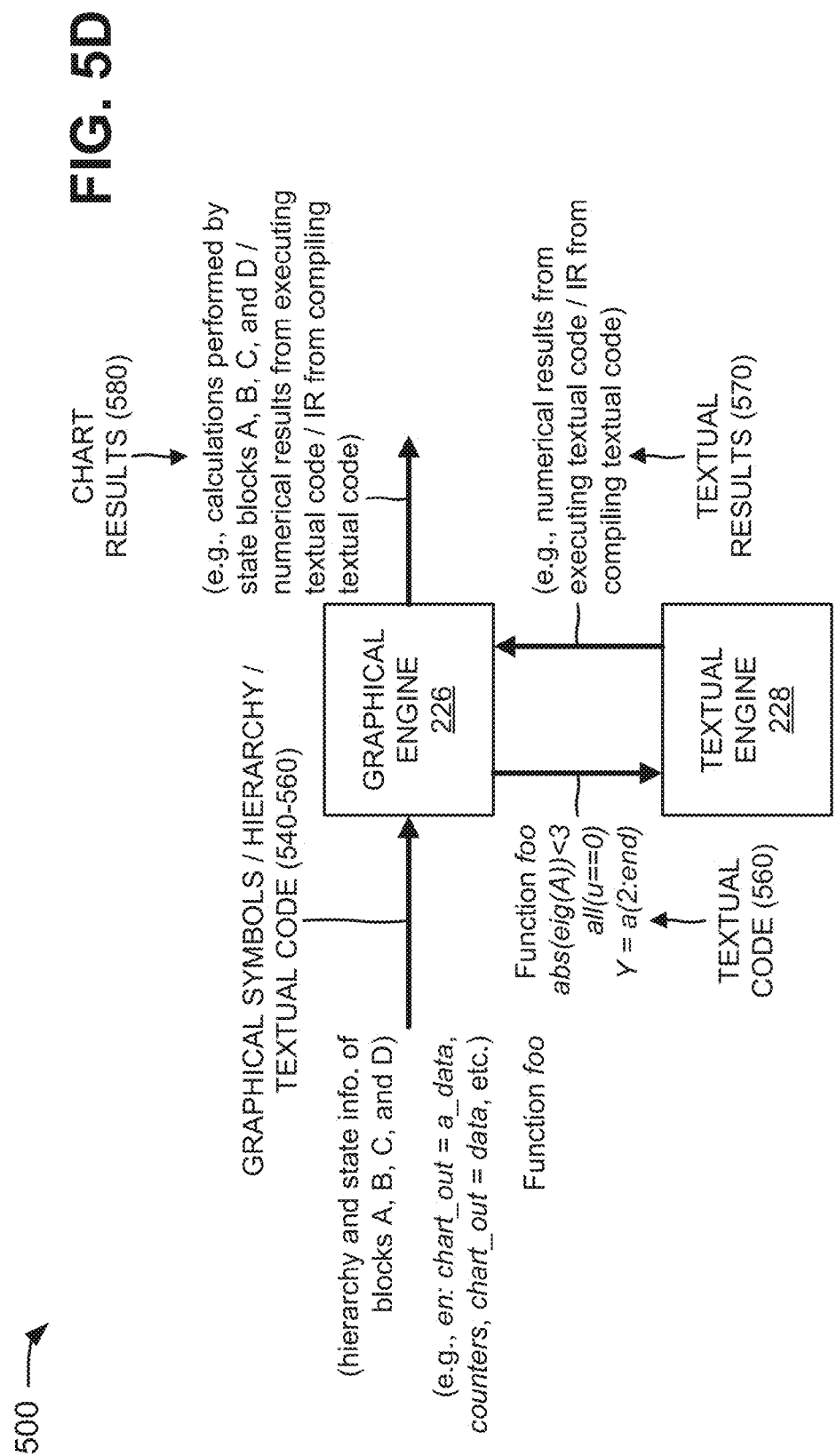

As shown in FIG. 5D, graphical engine 226 may receive information 540 associated with graphical symbols (e.g., chart_out=a_data), transformed graphical symbols 545 (e.g., counters), information 550 associated with the graphical hierarchy and state (e.g., the hierarchy and state information of state blocks A, B, C, and D), and information 560 associated with the textual code (e.g., the functions foo, abs(eig(A))<3, all(u==0), and Y=a(2:end)). In some implementations, information 560 associated with the textual code may include zero crossing detection and location information, for example, to determine when discrete events occur.

Graphical engine 226 may provide information 560 associated with textual code to textual engine 228. Textual engine 228 may process information 560 to generate textual results 570. In example 500, assume that textual results 570 include numerical results from executing the textual code (e.g., the function foo) and/or an intermediate representation (IR) from compiling the textual code. Textual engine 228 may provide textual results 570 to graphical engine 226. Graphical engine 226 may process information 540, transformed graphical symbols 545, information 550, and textual results 570 to generate chart results 580. In example 500, assume that chart results 580 include the calculations performed by one or more of state blocks A, B, C, and/or D, numerical results from executing the textual code (e.g., the function foo), and/or an intermediate representation (IR) from compiling the textual code.

Figure 5E:
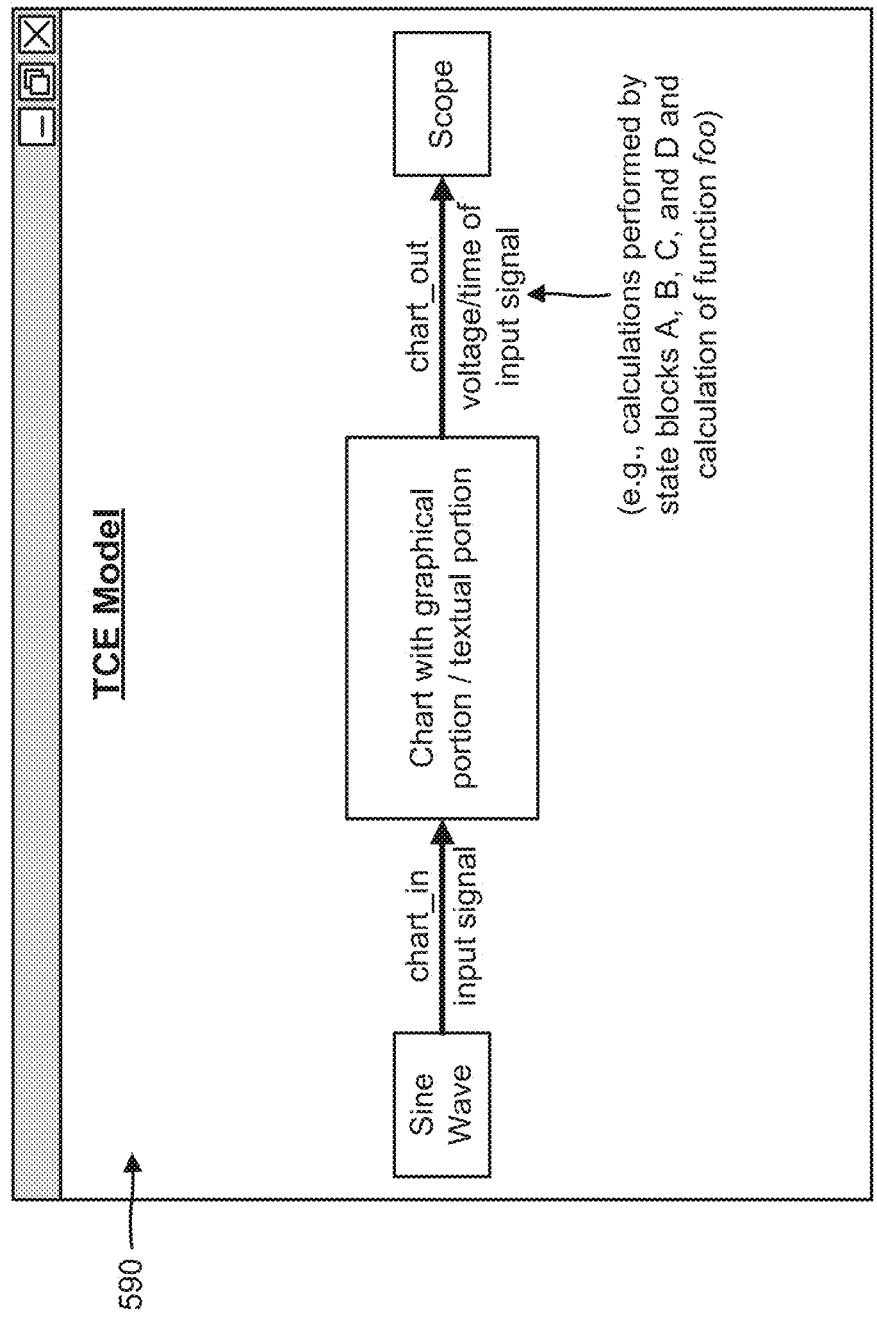

After one or more portions of the chart are executed and chart results 580 are generated, TCE 220 may utilize chart results 580 to execute the model. For example, as described above in connection with FIG. 5B, the chart may wake up and execute one or more of state blocks A, B, C, and D. In some implementations, the chart may execute one or more portions of a model and/or the model may execute one or more portions of the chart. As shown in FIG. 5E, TCE 220 may cause client device 210 to display a user interface 590 that includes the executed model. As shown in user interface 590, the chart block may receive an input signal (e.g., a sine wave) from the sine wave block, and may output a voltage/time signal, based on the input signal, to the scope block. As further shown, the voltage/time signal may correspond to the calculations performed by state blocks A, B, C, and/or D and/or the calculation of the function foo.

As indicated above, FIGS. 5A-5E are provided merely as an example. Other examples are possible and may differ from what was described with regard to FIGS. 5A-5E.

FIG. 6 is a flow chart of an example process 600 for linking textual portions and graphical portions of a technical computing environment model. In some implementations, one or more process blocks of FIG. 6 may be performed by client device 210. In some implementations, one or more process blocks of FIG. 6 may be performed by another device or a group of devices separate from or including client device 210, such as server device 230.

As shown in FIG. 6, process 600 may include providing a TCE user interface for creating a model (block 610). For example, TCE 220 may cause client device 210 to display a user interface to a user of client device 210. The user interface may include mechanisms (e.g., menus, buttons, icons, libraries, etc.) that enable the user to create a model using TCE 220. In some implementations, the user may wish to create a model that includes a chart with one or more chart elements (e.g., state blocks), one or more input signals, and one or more output signals. One or more of the chart elements may correspond to a status of a physical device, a subsystem, a model, etc. of a system being modeled.

As further shown in FIG. 6, process 600 may include receiving a graphical hierarchy and graphical symbols for the model (block 620). For example, the user may utilize the user interface to create a model that includes a chart with a graphical hierarchy of one or more chart elements (e.g., state blocks), one or more input signals, and one or more output signals. For example, the user may create, via the user interface, a chart with state blocks E, F, and G, where state block E includes state block F and does not include but transitions to state block G. An arrangement that includes a state block containing one or more other state blocks and/or transitioning to one or more other state blocks (e.g., via a containment hierarchy) may be referred to as a graphical hierarchy. In some implementations, the graphical hierarchy may include other arrangements of state blocks, different types of decomposition with different scoping rules (e.g., "and" state decomposition, "or" state decomposition, etc.). The user may utilize the user interface to connect the state blocks together in the graphical hierarchy. In some implementations, the user may utilize the user interface to associate graphical symbols with the state blocks of the chart. The graphical symbols may include, for example, textual information that provides event-based conditions, time-based conditions, etc. to the state blocks. For example, the graphical symbols may include text for a time-based condition (e.g., after(10, sec), before(5, sec), etc.), text for an event-based condition (e.g., when a function is executed), etc.

As further shown in FIG. 6, process 600 may include receiving textual code for the model (block 630). For example, the user may utilize the user interface to provide, within one or more of the state blocks, textual code that may be understood and processed by textual engine 228 of TCE 220. In some implementations, the textual code may include one or more functions, matrices, arrays, data, etc. that may be understood and processed by textual engine 228. For example, the textual code may include text for a function (e.g., foo, bar, etc.), text for a matrix (e.g., C=[1, 2, 3]), array-based text, dynamically-typed text, dynamic assignments, script or function name spaces, etc. (e.g., text that ignores certain output arguments, a function with logic that involves a caller's number of output arguments, fixed point quantities that use integer containers to specify approximate floating point values, text to select elements based on specification, etc.).

As further shown in FIG. 6, process 600 may include linking the textual code to the graphical hierarchy based on the graphical symbols (block 640). For example, TCE 220 may determine whether any of the graphical symbols of the state blocks reference the textual code. In some implementations, TCE 220 may compare the graphical symbols to the textual code to determine whether any of the graphical symbols match the textual code. For example, if the model includes textual code for a function foo and if particular graphical symbols in the model include the text "foo," TCE 220 may determine that the particular graphical symbols match the textual code for the function foo. In some implementations, the textual code may be referenced by graphical symbols associated with one or more of the state blocks, and may be utilized by the state block(s) that reference the textual code. For example, if a particular state block includes graphical symbols referencing a function bar, the particular state block may utilize results associated with the execution of the function bar.

In some implementations, TCE 220 may automatically (or when instructed by the user) link the textual code to the graphical hierarchy based on the graphical symbols. For example, assume that a state block A includes the function bar (e.g., textual code) and that a state block B includes a reference (e.g., graphical symbols) to the function bar. In such an example, TCE 220 may link the function bar to state block B, in the graphical hierarchy, based on the reference to the function bar. When TCE 220 links the function bar to state block B, state block B may utilize results associated with the execution of the function bar.

As further shown in FIG. 6, process 600 may include processing the model to generate output code (block 650). For example, TCE 220 may process the model to generate output code. In some implementations, TCE 220 may execute the model based on the graphical hierarchy, the graphical symbols, and the textual code of the model to generate the output code. For example, assume that a model includes a chart with state blocks A and B, calculations (e.g., graphical symbols) associated with the state blocks, and a function X (e.g., textual code). TCE 220 may execute the calculations associated with state blocks A and B to generate output code, and/or may determine the output code for the function X. In some implementations, the output code may include TCE code (e.g., MATLAB code), C code, C++ code, Pascal code, Fortran code, Hardware Description Language (HDL) code, Java code, and/or code for other languages.

As further shown in FIG. 6, process 600 may include executing, storing, and/or embedding the output code (block 660). For example, TCE 220 may cause client device 210 to execute the output code, and to provide results of the executed code for display to the user. In some implementations, TCE 220 may cause client device 210 to store the output code in memory (e.g., memory 330, storage component 340, etc.) associated with client device 210 and/or server device 230. In some implementations, TCE 220 may cause client device 210 to embed the output code in a physical device (e.g., a robot, manufacturing equipment, etc.). The physical device may utilize the output code to perform one or more tasks (e.g., perform manufacturing operations).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
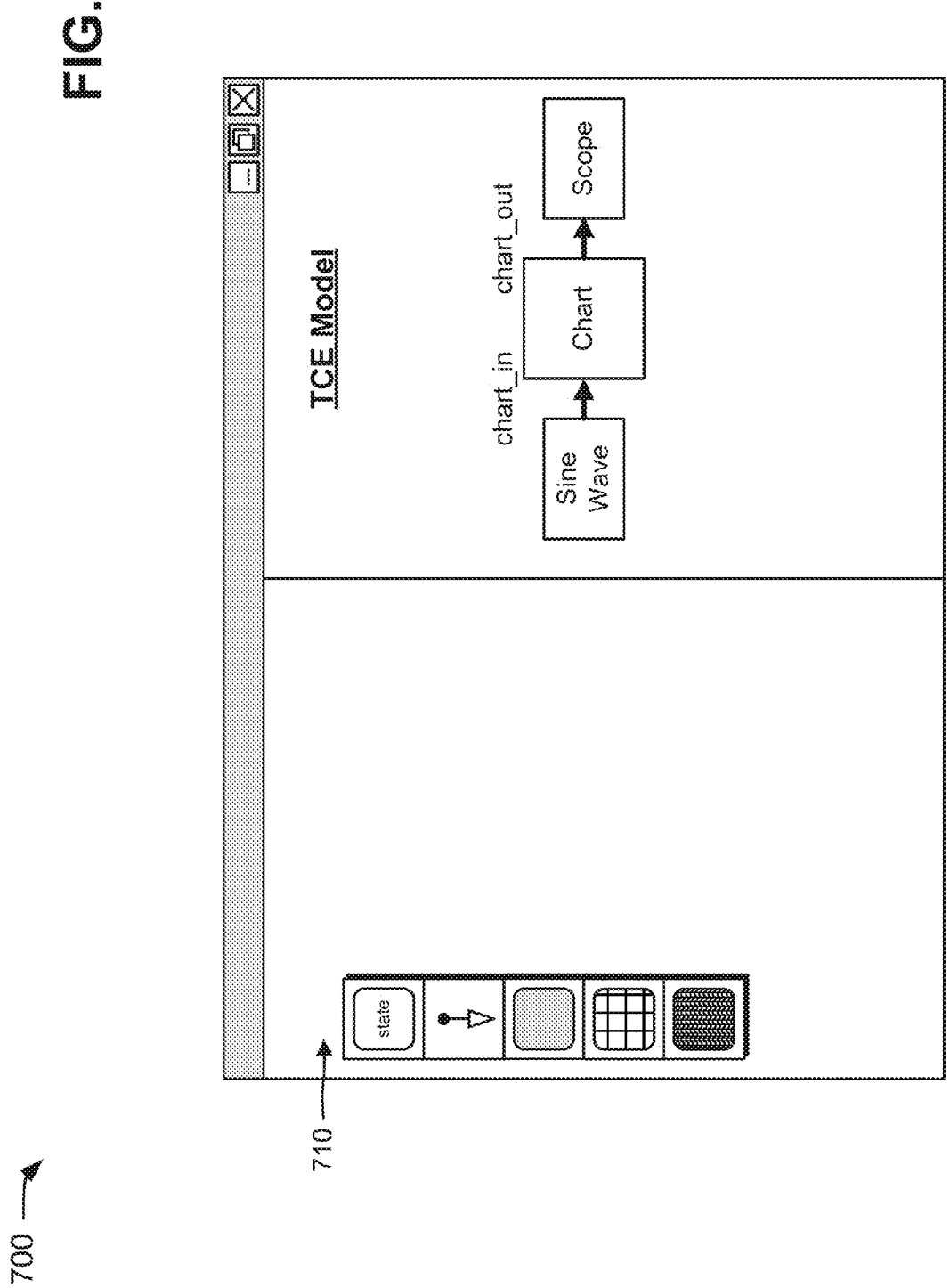
FIGS. 7A-7E are diagrams of an example relating to the example process shown in FIG. 6.
Figure 7B:
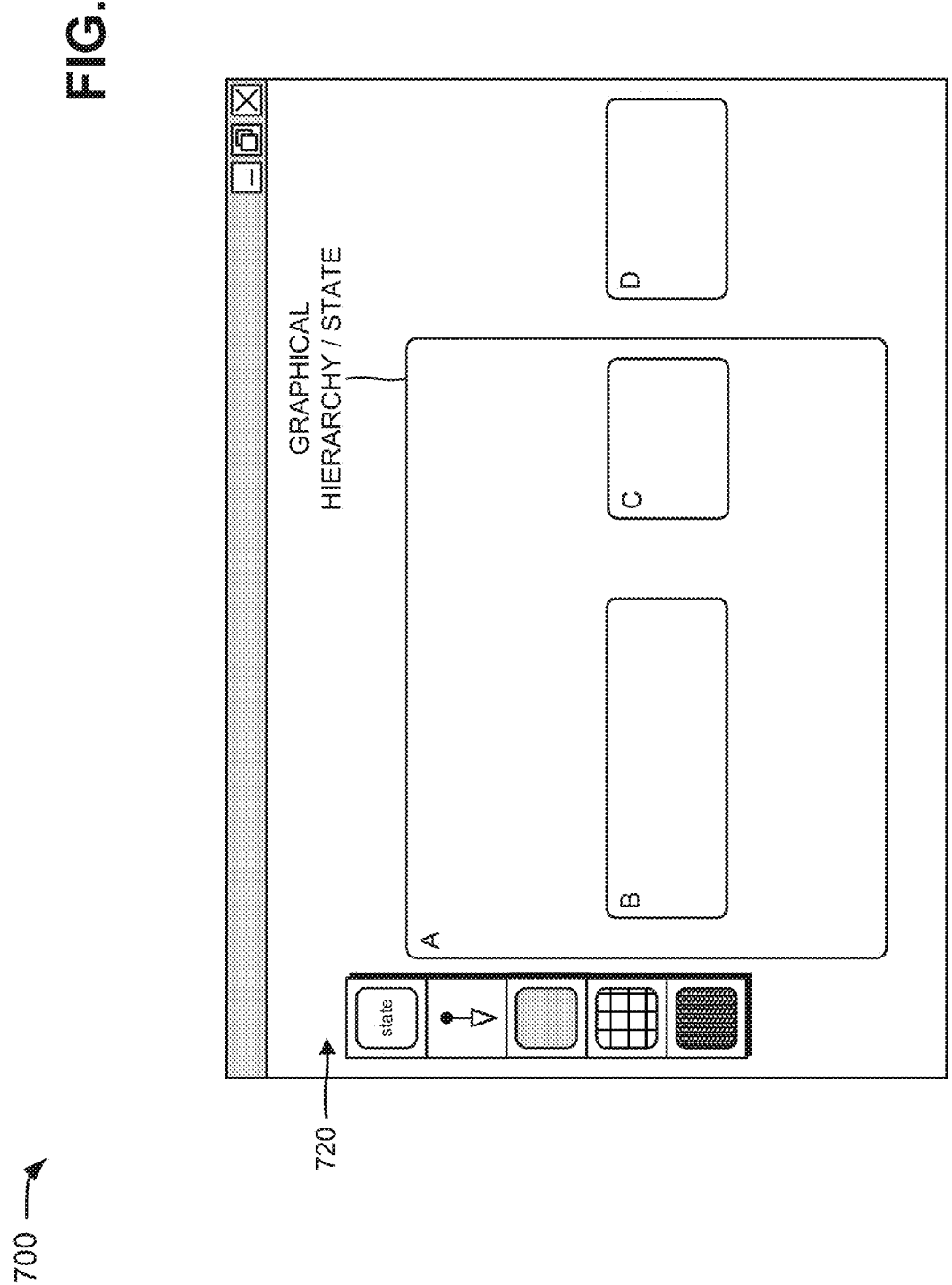
Figure 7C:
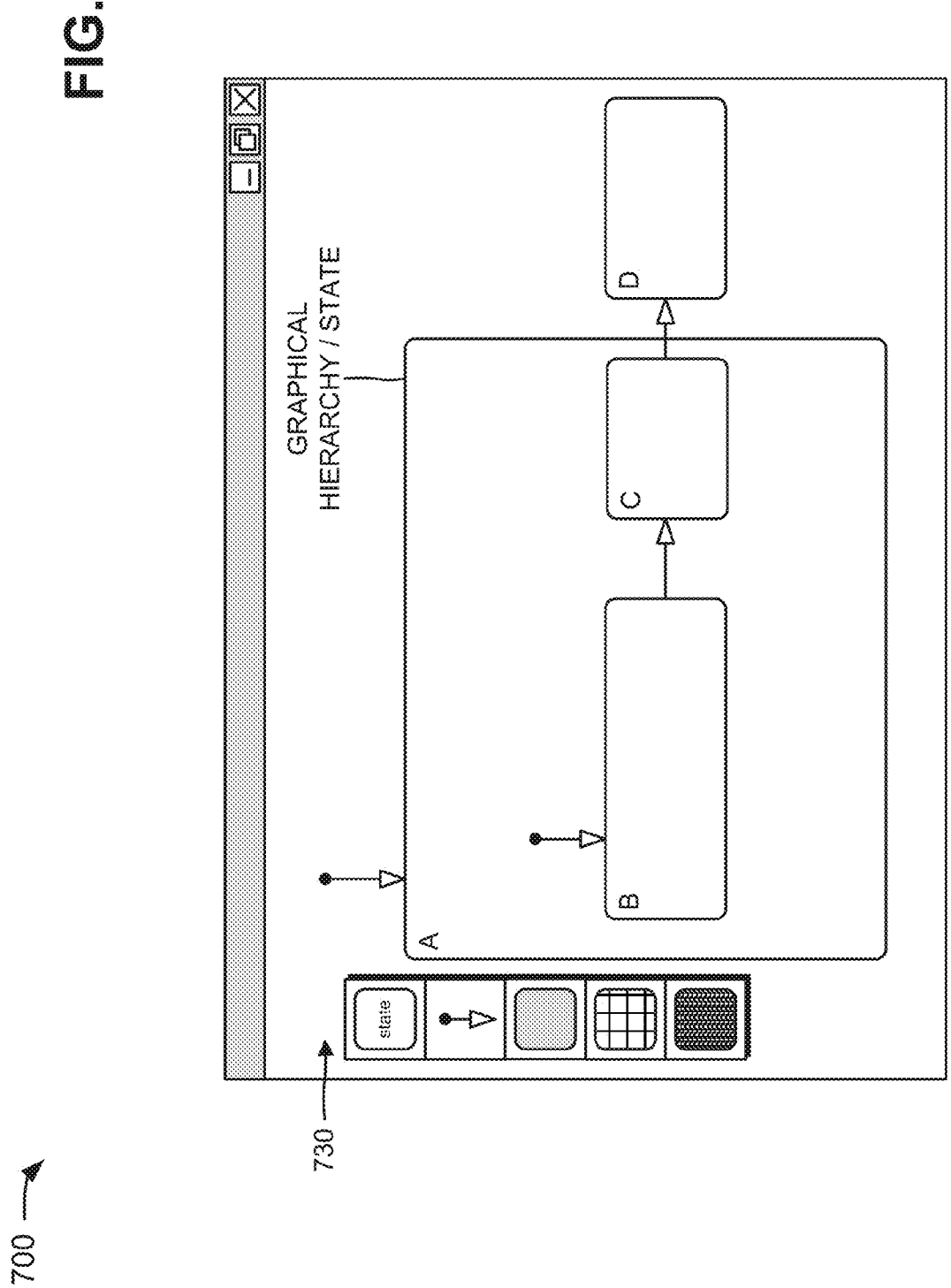

FIGS. 7A-7E are diagrams of an example 700 relating to example process 600 shown in FIG. 6. In example 700, assume that a user of client device 210 utilizes TCE 220 to create a model or to import the model into TCE 220. As shown in FIG. 7A, TCE 220 may cause client device 210 to display the model in a user interface 710 as the user creates the model or after the user imports the model. The model may include a sine wave block, a chart block, and a scope block.

The sine wave block may include a representation of a sine wave that is to be displayed by the scope block. Assume that the sine wave block provides a chart_in signal (e.g., a sine wave signal) to the chart block. The chart block may include a representation of a chart that processes the sine wave signal so that it may be understood by the scope block. The chart block may receive the chart_in signal, and may process the chart_in signal to produce a chart_out signal (e.g., a voltage/time signal to be displayed by the scope block). The chart block may provide the chart_out signal to the scope block. The scope block may include a representation of an oscilloscope that displays constantly varying signal voltages as a function of time. The scope block may receive the chart_out signal, and may display the signal (e.g., a voltage/time signal).

As further shown in FIG. 7A, user interface 710 may include a menu of icons or buttons that enable the user to create elements of the chart of the model. The user may utilize the menu to add one or more state blocks to the chart. In example 700, assume that the user utilizes the menu to add state blocks A, B, C, and D to the chart, as shown in a user interface 720 of FIG. 7B. As further shown in user interface 720, state block A may include state blocks B and C, and state block A may be separate from state block D. The arrangement of state blocks A, B, C, and D may create a graphical hierarchy (e.g., a containment hierarchy) of state information (e.g., state blocks).

The user may utilize the menu to connect state blocks A, B, C, and D together. In example 700, assume that the user utilizes the menu to add connector arrows to the chart, as shown in a user interface 730 of FIG. 7C. As further shown in user interface 730, state block A may receive an input arrow, and may connect to state block B. State block B may connect to state block C, and state block C may connect to state block D.

Figure 7D:
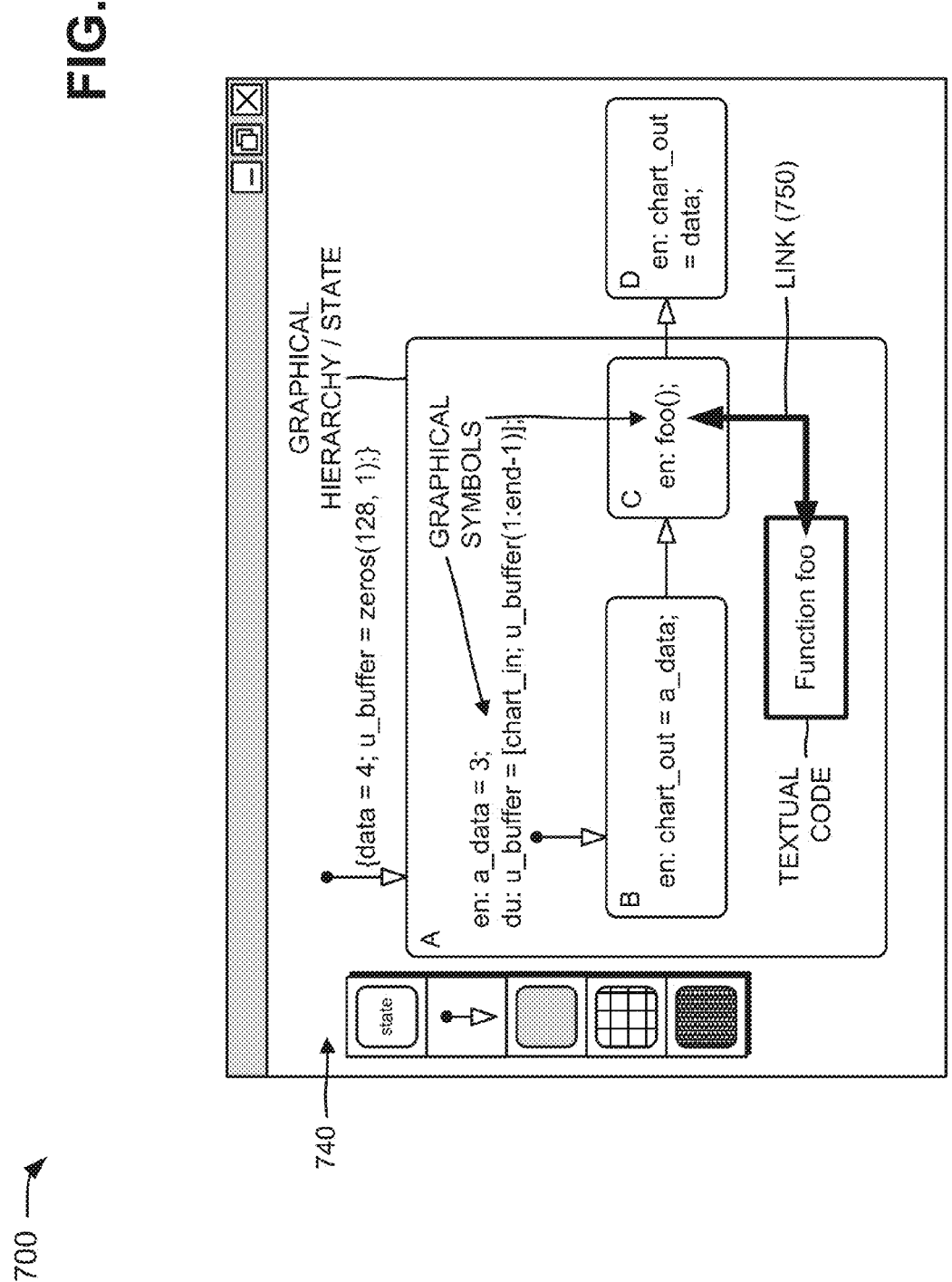

After connecting state blocks, or while adding the connector arrows, the user may provide state information to state blocks A, B, C, and D, as shown in a user interface 740 of FIG. 7D. In example 700, state blocks A, B, C, and D may include state information provided by graphical symbols. For example, state block A may include the graphical symbols en: a_data=3 and du: u_buffer=[chart_in; u_buffer(1:end−1)]; state block B may include the graphical symbols en: chart_out=a_data; state block C may include the graphical symbols en: foo( ) and state block D may include the graphical symbols en: chart_out=data. The user may provide graphical symbols (e.g., {data=4; u_buffer=zeros(128, 1);}) as event statements, condition statements, statements to implement when transitioning to state block A, and/or actions to take when transitioning to state block A. The user may also provide, in state block A, a textual code (e.g., a function foo) that may be understood by textual engine 228, as further shown in FIG. 7D. For example, the user may add a text block into state block A, and, once added, a user interface may be presented to the user. The user interface may enable the user to specify the textual code and/or a graphical symbol by typing the textual code/graphical symbol or by identifying a location where the textual code/graphical symbol is stored.

TCE 220 may link the textual code to the graphical hierarchy based on the graphical symbols. In example 700, TCE 220 may link the function foo to state block C, in the graphical hierarchy, based on the reference to the function foo provided in state block C, as indicated by reference number 750 in FIG. 7D. When TCE 220 links the function foo to state block C, state block C may call function foo to be executed (e.g., operations and statements that are associated with state block C may have access to the function foo and results associated with the execution of the function foo).

Figure 7E:
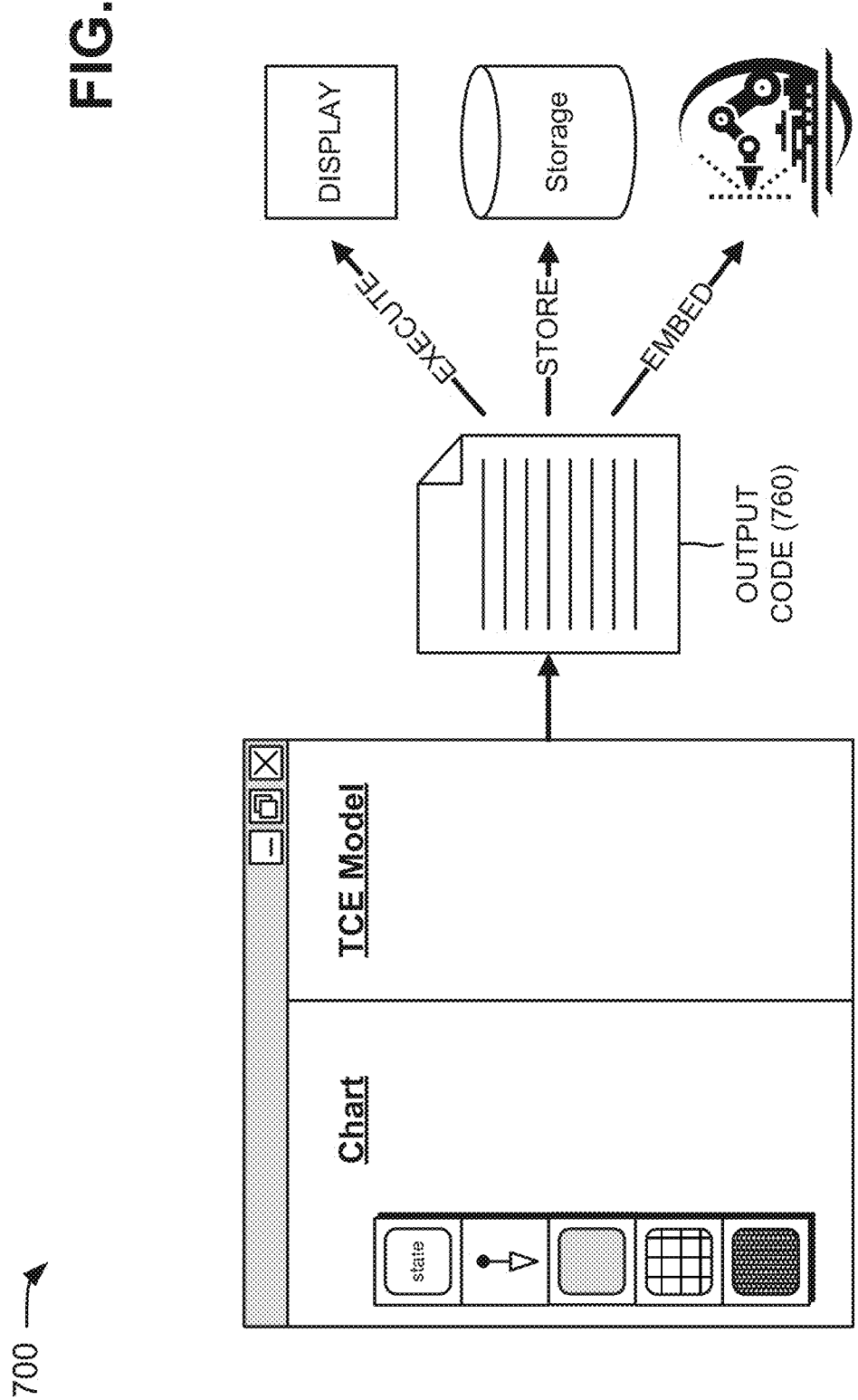

In example 700, further assume that the user utilizes client device 210 to instruct TCE 220 to execute the model. TCE 220 may generate output code 760 (e.g., TCE code, C code, C++ code, etc.) for the model and the chart based on the graphical hierarchy, the graphical symbols, and the textual code, as shown in FIG. 7E. In example 700, assume that TCE 220 executes the graphical symbols associated with state blocks A, B, C, and D, in accordance with the graphical hierarchy, and generates output code 760 based on the function foo. As further shown in FIG. 7E, TCE 220 may cause client device 210 to execute output code 760, and to provide results of the executed output code 760 for display to the user. Alternatively, or additionally, TCE 220 may cause client device 210 to store output code 760 in storage associated with client device 210 and/or server device 230. Alternatively, or additionally, TCE 220 may cause client device 210 to embed output code 760 in a physical device (e.g., a robot, a machine, etc.) for utilization by the physical device.

As indicated above, FIGS. 7A-7E are provided merely as an example. Other examples are possible and may differ from what was described with regard to FIGS. 7A-7E.

Figure 8:
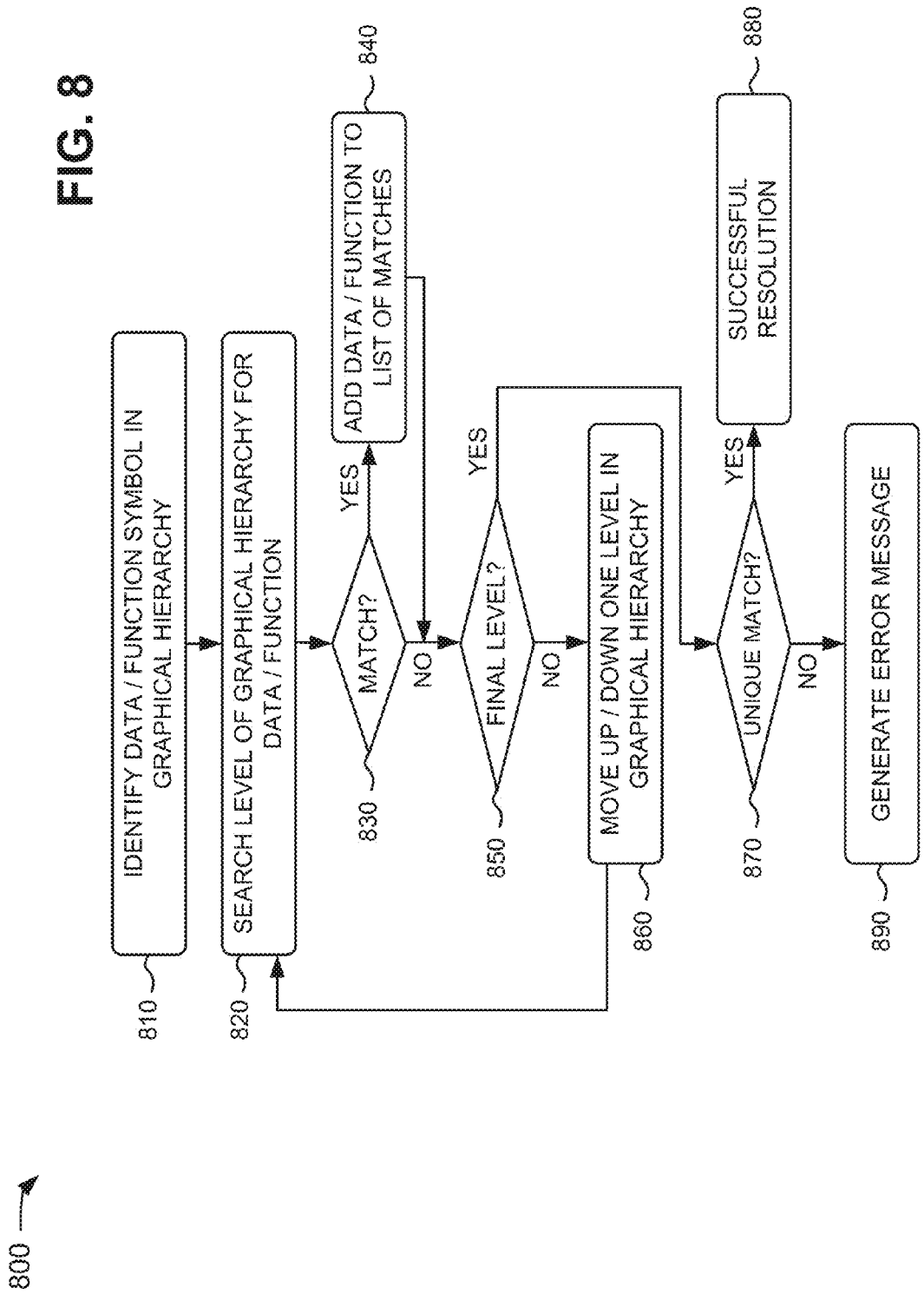
FIG. 8 is a flow chart of an example process for matching data and/or a function with a data/function symbol of a graphical hierarchy.

FIG. 8 is a flow chart of an example process 800 for matching data and/or a function with a data/function symbol of a graphical hierarchy. In some implementations, one or more process blocks of FIG. 8 may be performed by client device 210. In some implementations, one or more process blocks of FIG. 8 may be performed by another device or a group of devices separate from or including client device 210, such as server device 230.

As shown in FIG. 8, process 800 may include identifying a data symbol or a function symbol in a graphical hierarchy (block 810). For example, TCE 220 may enable a user of client device 210 to create a model or to instruct client device 210 to receive the model from another source. In some implementations, the model may include a chart with a graphical hierarchy of one or more chart elements (e.g., state blocks), one or more input signals, and one or more output signals. One or more of the chart elements may correspond to a status of a physical device, a subsystem, a model, etc. of a system being modeled.

In some implementations, the chart may include graphical symbols associated with the state blocks of the chart. The graphical symbols may include, for example, textual information that provides event-based conditions, time-based conditions, etc. to the state blocks. In some implementations, one or more of the state blocks may include textual code that may be understood and processed by textual engine 228 of TCE 220. The textual code may include, for example, one or more functions, matrices, arrays, data, etc. that may be understood and processed by textual engine 228.

In some implementations, TCE 220 may identify a data symbol or a function symbol in the graphical hierarchy. For example, a particular state block may include graphical symbols that reference data and/or a function (e.g., textual code) provided in the particular state block or in another state block of the chart. In one example, assume that a state block includes data X or a function Y, and that another state block includes a data symbol (e.g., X.temperature) referencing data X or a function symbol (e.g., Y.get_pressure) referencing function Y. In such an example, TCE 220 may identify the data symbol X.temperature or the function symbol Y.get_pressure. Such referencing of data or functions may be referred to as dot notation. Dot notation may include a way to identify data or a function at a specific level of the chart hierarchy. A qualified data or function name may utilize dot notation to specify a path to a parent state block for that data or function.

As further shown in FIG. 8, process 800 may include searching a level of the graphical hierarchy for data or a function (block 820). For example, TCE 220 may search a level of the graphical hierarchy of the chart for data or a function that corresponds to the identified data symbol or function symbol. In some implementations, TCE 220 may first search the level (e.g., a state block) of the graphical hierarchy, for the data or the function, where the data symbol or the function symbol appears. For example, if a particular state block includes a data symbol (e.g., X.temperature) referencing temperature data or a function symbol (e.g., Y.get_pressure) or Y.get_pressure( ) referencing a get pressure function, TCE 220 may search the particular state block first for the data or the function symbol. In some implementations, TCE 220 may begin searching at a highest level of the graphical hierarchy for the data/function and move down the graphical hierarchy level by level until the data/function has been found. In some implementations, TCE 220 may begin searching at a lowest level of the graphical hierarchy for the data/function and move up the graphical hierarchy level by level until the data/function is found. In some implementations, TCE 220 may include a global or logical workspace that may be searched first or last, for example, for data and/or a function. In some implementations, in addition to dot notation, a function, a method, a procedure, etc. may be distinguished from data based on open and closed parentheses.

As further shown in FIG. 8, process 800 may include determining whether the identified data symbol or function symbol matches any data or functions of the searched level of the graphical hierarchy (block 830). For example, TCE 220 may identify any data or functions contained in the graphical hierarchy level, and may compare the identified data or functions to the data symbol or the function symbol. If an identified data or function of the graphical hierarchy level includes the same syntax as the data symbol or the function symbol, TCE 220 may determine that the identified data or function matches the data symbol or the function symbol. For example, if a particular state block includes data X or a function Y, TCE 220 may determine that data X or function Y matches a data symbol (e.g., X.temperature) or a function symbol (e.g., Y.get_pressure). If an identified data or function of the graphical hierarchy level does not include the same syntax as the data symbol or the function symbol, TCE 220 may determine that the identified data or function does not match the data symbol or the function symbol. For example, if a particular state block includes data A or function B, TCE 220 may determine that data A or a function B does not match the data symbol (e.g., X.temperature) or the function symbol (e.g., Y.get_pressure). In some implementations, this matching may include matching an argument list in terms of a number of arguments, data types, sample times, etc., and the matching of data may proceed accordingly.

As further shown in FIG. 8, if the identified data symbol or function symbol matches any data or functions of the searched level of the graphical hierarchy (block 830—YES), process 800 may include adding the data or the function to a list of matches (block 840) and proceed to block 850. For example, if an identified data or function of the graphical hierarchy level includes the same syntax as the data symbol or the function symbol, TCE 220 may determine that the identified data or function matches the data symbol or the function symbol. In some implementations, TCE 220 may add the identified data or function to a list of matches stored in memory (e.g., of client device 210). For example, if a particular state block includes data X or a function Y, TCE 220 may determine that data X or function Y matches a data symbol (e.g., X.temperature) or a function symbol (e.g., Y.get_pressure) and may add information (e.g., a path to the data or the function) associated with data X or a function Y to a list of matches.

As further shown in FIG. 8, if the identified data symbol or function symbol does not match any data or functions of the searched level of the graphical hierarchy (block 830—NO), process 800 may include determining whether the level is a final level of the graphical hierarchy (block 850). For example, if an identified data or function of the graphical hierarchy level does not include the same syntax as the data symbol or the function symbol, TCE 220 may determine that the identified data or function does not match the data symbol or the function symbol. In such situations, TCE 220 may determine whether all of the levels of the graphical hierarchy have been searched. In some implementations, the final level of the graphical hierarchy may include a chart level in the graphical hierarchy. For example, assume that the chart includes state blocks A, B, and C, that state block A transitions to state block B, and that state block B transitions to state block C. In this example, the chart area outside of state blocks A, B, and C may be considered the final level of the graphical hierarchy. If TCE 220 searches a lowest level (e.g., a leaf state) of the graphical hierarchy and traverses the graphical hierarchy upwards, the chart level (e.g., a root state) may be the last level of the search. In some implementations, TCE 220 may continue the search through the graphical model with subsystems and/or workspaces until TCE 220 reaches a global workspace of TCE 220 as the last level of the search.

As further shown in FIG. 8, if the level is not the final level of the graphical hierarchy (block 850—NO), process 800 may include moving up or down one level of the graphical hierarchy (block 860) and returning to block 820. For example, if TCE 220 determines that the searched level of the graphical hierarchy is not the chart level or root level of the graphical hierarchy, TCE 220 may move up one level in the graphical hierarchy and continue the search for matching data or functions. For example, assume again that the graphical hierarchy includes state blocks A, B, and C, that state block A contains state block B, and that state block B contains state block C. If TCE 220 searched state block C for matching data or functions, TCE 220 may move to state block B and continue the search for matching data or functions. If TCE 220 searched state block B for matching data or functions, TCE 220 may move up to state block A and continue the search for matching data or functions. If TCE 220 searched state block A for matching data or functions, TCE 220 may move up the chart level and continue the search for matching data or functions based on an arrangement of the state blocks. In some implementations, TCE 220 may start searching at the chart level of the graphical hierarchy and may traverse the graphical hierarchy in a downward direction. In some implementations, TCE 220 may search a global workspace, including an environment (e.g., a path) of the global workspace.

As further shown in FIG. 8, if the level is the final level of the graphical hierarchy (block 850—YES), process 800 may include determining whether a unique data or function is provided in the list of matches (block 870). For example, if TCE 220 determines that the searched level of the graphical hierarchy is the chart level of the graphical hierarchy, TCE 220 may determine whether the list of matches includes a single entry associated with matching data or a function. In some implementations, if the list of matches includes a single entry associated with matching data or a function, TCE 220 may determine that there is a unique data or function provided in the list of matches. In some implementations, if the list of matches includes more than one entry (or no entries) associated with matching data or a function, TCE 220 may determine that there is not a unique data or function provided in the list of matches.

As further shown in FIG. 8, if there is a unique data or function provided in the list of matches (block 870—YES), process 800 may include providing an indication of successful resolution of the data symbol or the function symbol (block 880). For example, if TCE 220 determines that there is a unique data or function provided in the list of matches, TCE 220 may cause client device 210 to display an indication of successful resolution of the data symbol or the function symbol.

As further shown in FIG. 8, if there is not a unique data or function provided in the list of matches (block 870—NO), process 800 may include generating an error message associated with the data symbol or the function symbol (block 890). For example, if TCE 220 determines that there are two or more data or functions identified in the list of matches or that no data or functions are identified in the list of matches, TCE 220 may cause client device 210 to display an error message associated with the data symbol or the function symbol. In some implementations, the error message may indicate that the data symbol or the function symbol cannot be successful resolved in the graphical hierarchy. In some implementations, if there is no unique data or function, rules to resolve to a unique one may be applied by TCE 220. In some implementations, a user may set up rules to resolve when a same data symbol or function symbol is encountered in a search. For example, TCE 220 may dynamically resolve workspaces (e.g., "A.data" may be replaced with "$active.data," where "$active" may resolve at execution time to an active substate).

In some implementations, when performing process 800, TCE 220 may automatically search for and extract all data/function symbols of a graphical hierarchy of a chart. For each data/function symbol, TCE 220 may automatically search the graphical hierarchy for data or a function that matches the data/function symbol. If there is a single match for the data/function symbol, TCE 220 may automatically create the list of matches. If there are no matches for the data/function symbol, TCE 220 may provide, to the user, a notification (e.g., an error message) indicating that there are no matches for the data/function symbol. If there are multiple matches for the data/function symbol, TCE 220 may provide, to the user, a notification (e.g., an error message) indicating that there are multiple matches and identifying the multiple matches in the chart. The user may remove the multiple matches so that a single match for the data/function symbol remains in the chart. For all data/function symbols with a single matching data or function, TCE 220 may automatically link the data/function symbols with the corresponding data or function.

In some implementations, TCE 220 may cause client device to display a user interface that enables the user to specify a data/function symbol. TCE 220 may perform the automatic process described above for the specified data/function symbol, and may inform the user as to whether there is a single match for the specified data/function symbol, no matches for the specified data/function symbol, or multiple matches for the specified data/function symbol.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9B:
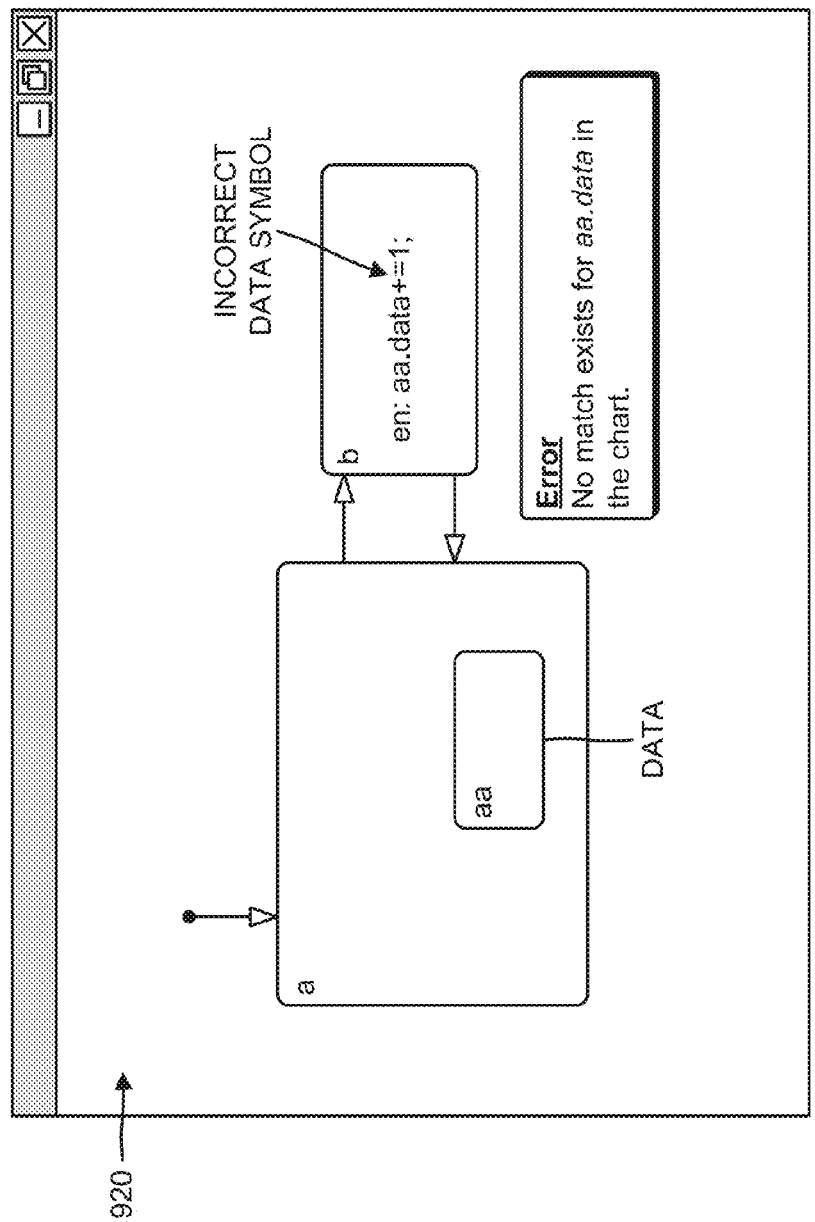

FIGS. 9A-9E are diagrams of an example 900 relating to example process 800 shown in FIG. 8. In example 900, assume that a user of client device 210 utilizes TCE 220 to create a chart or to import the chart into TCE 220. As shown in FIG. 9A, TCE 220 may cause client device 210 to display the chart in a user interface 910. The chart may include a graphical hierarchy of state blocks a and b. The graphical hierarchy may include the arrangement of the state blocks in the chart. For example, state block a may be transitioned to first and state block b may be transitioned to second. The state blocks may include state information provided by graphical or data symbols. For example, state block a may include a state (e.g., aa) with a data object (e.g., data). State block a may also include the data symbols en: y+=aa.data (e.g., which references state aa and data); and aa.data+=1 (e.g., which references state aa and data). State block b may include the data symbols en: a.aa.data+=1 (e.g., which references state a, state aa, and data). State block a may receive an input data symbol (e.g., {y=a.aa.data}, which references state a, state aa, and data). Although not shown in FIGS. 9A-9E, the chart may also include function symbols or the function symbols may replace the data symbols.

TCE 220 may automatically (or at the user's request) analyze the chart and may determine whether the data symbols of the chart may be successfully resolved to state aa and data. In example 900, assume that TCE 220 identifies the data symbol (e.g., a.aa.data) in the input, and searches state block a for state aa and data based on the data symbol. TCE 220 may locate state aa and data in state block a, and may add state aa and data to a list of matches. TCE 220 may search a chart level (e.g., the next level) outside of state blocks a and b, and may not locate state aa and data in the chart level. TCE 220 may not continue to search for state aa and data in the chart since the chart level is the final level of the chart. In example 900, assume that TCE 220 identifies the data symbol (e.g., aa.data) in state block a, and searches state block a for state aa and data based on the data symbol. TCE 220 may locate state aa and data in state block a, and may add state aa and data to another list of matches. TCE 220 may search the chart level (e.g., the next level) for state aa and data and may not locate state aa and data in the chart level. TCE 220 may not continue to search for state aa and data in the chart since the chart level is the final level of the chart.

Further, assume that TCE 220 identifies the data symbol (e.g., a.aa.data) in state block b, and searches state block b for state aa and data based on the data symbol. TCE 220 may not locate state aa and data in state block b, and may move up one level in the chart to state block a. TCE 220 may search state block a for state aa and data, may locate state aa and data in state block a, and may add state aa and data to still another list of matches. TCE 220 may search the chart level for state aa and data and may not locate state aa and data in the chart level. TCE 220 may not continue to search for state aa and data in the chart since the chart level is the final level of the chart.

Thus, TCE 220 successfully resolves each of the data symbols in the chart since each list of matches may include a unique match associated with state aa and data for each of the data symbols. As further shown in FIG. 9A, since TCE 220 successfully resolves the data symbols, TCE 220 may cause client device 210 to display an indication that a unique match exists for each of the data symbols (e.g., aa.data and a.aa.data) in the chart.

Assume that the user modifies the chart to include the information provided in a user interface 920 of FIG. 9B. For example, assume that the user removes the data symbols from state block a and removes the input data symbol. Further, assume that the user modifies the data symbol of state block b to include the text en: aa.data+=1 (e.g., which references state aa and data). TCE 220 may identify the data symbol (e.g., aa.data) in state block b, and may search state block b for state aa and data based on the data symbol. TCE 220 may not locate state aa and data in state block b, and may move up to the chart level of the chart, rather than to state block a, since state block a is not referenced by the data symbol (e.g., as was the case in FIG. 9A). TCE 220 may search the chart level for state aa and data, and may not locate state aa and data in the chart level.

The search may end, and TCE 220 may cause client device 210 to display an error message indicating that no match exists for aa.data in the chart, as further show in FIG. 9B.

Figure 9C:
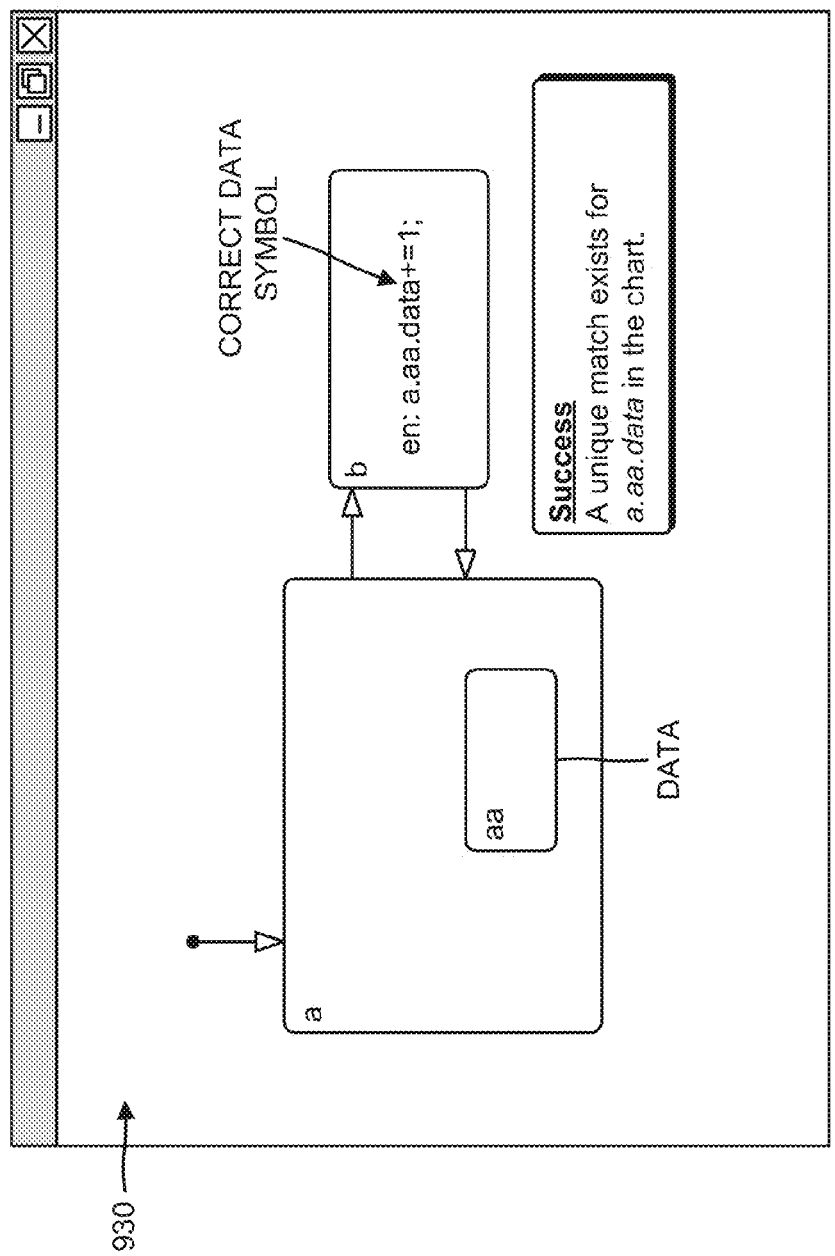

Based on the error message of FIG. 9B, assume that the user modifies the data symbol to include the text a.aa.data (e.g., which references state a, state aa, and data), as shown in a user interface 930 of FIG. 9C. TCE 220 may identify the data symbol (e.g., a.aa.data) in state block b, and may search state block b for state aa and data based on the correct data symbol. TCE 220 may not locate state aa and data in state block b, and may move up one level in the chart to state block a. TCE 220 may search state block a for state aa and data, may locate state aa and data in state block a, and may add state aa and data to a list of matches. TCE 220 may search the chart level for state aa and data and may not locate state aa and data in the chart level. The search may end, and TCE 220 may cause client device 210 to display an indication that a unique match exists for the data symbol (e.g., a.aa.data) in the chart, as further shown in FIG. 9C. In some implementations, the search may end when a first match is identified, and only a global workspace search may be performed after the search ends.

Figure 9D:
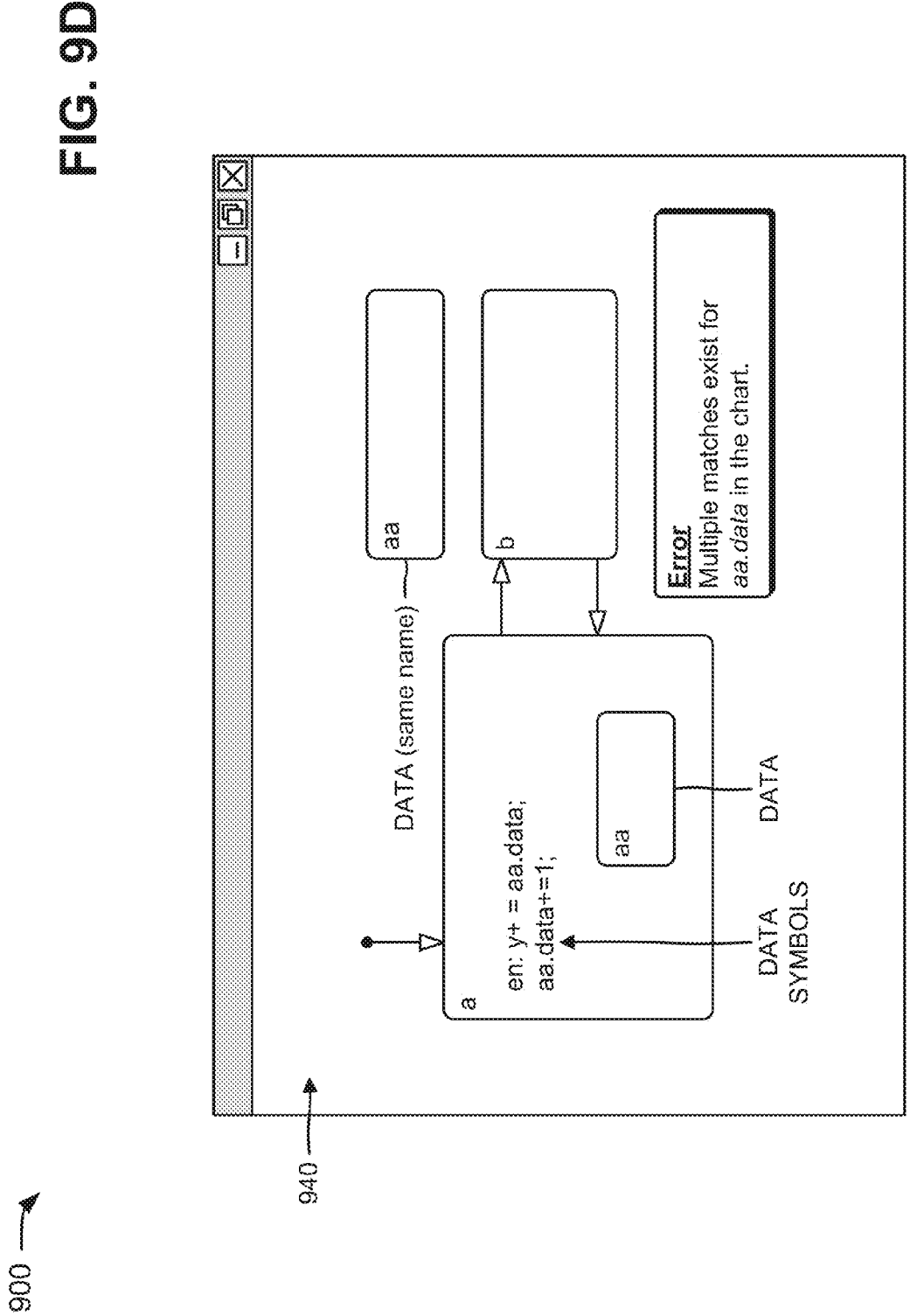
Figure 9E:
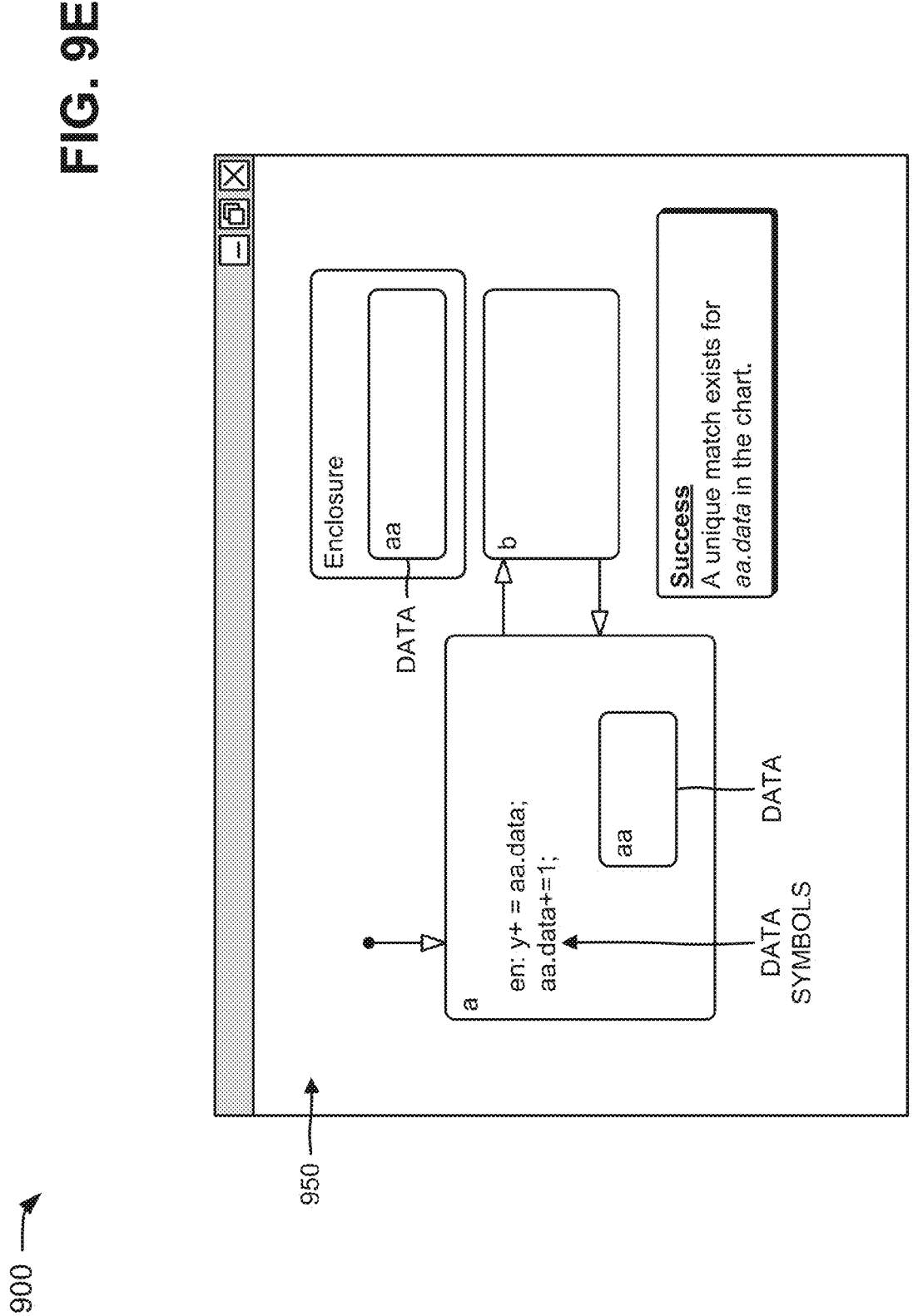

Now assume that the user modifies the chart to include the information provided in a user interface 940 of FIG. 9D. For example, assume that the user removes the input data symbol and the data symbol from state block b. Further, assume that the user adds data symbols en: y+=aa.data (e.g., which references state aa and data); and aa.data+=1 (e.g., which references state aa and data) to state block a, and creates an additional state aa and data separate from state blocks a and b. The additional state aa and data may include the same name as state aa and data provided in state block a. TCE 220 may identify the data symbol (e.g., aa.data) in state block a, and may search state block a for state aa and data based on the data symbol. TCE 220 may locate state aa and data in state block a, and may add state aa and data to a list of matches. TCE 220 may search the chart level for state aa and data, may locate state aa and data in the chart level (e.g., the additional state aa and data), and may add the additional state aa and data to the list of matches. The search may end, and TCE 220 may cause client device 210 to display an error message indicating that multiple matches exist for aa.data in the chart, as further shown in FIG. 9D.

Based on the error message of FIG. 9D, the user may rename one of the states named state aa and data so that multiple matches do not exist for aa.data. Alternatively, the data symbols of state block a may be modified to include a more specific path for the data names. For example, the user may change the data symbols of state block a to en: y+=a.aa.data (e.g., which references state a, state aa, and data); and a.aa.data+=1 (e.g., which references state a, state aa, and data). This may cause TCE 220 to only search state block a for matching states named state aa and data. Alternatively, the user may enclose the additional state aa and data in an enclosure or another state, as shown in a user interface 950 of FIG. 9E. The enclosure or other state may prevent TCE 220 from detecting the additional state aa and data when TCE 220 is searching for matching states named state aa and data in the chart level. As further shown in FIG. 9E, when the enclosure or other state is added, TCE 220 may cause client device 210 to display an indication that a unique match exists for the data symbol (e.g., aa.data) in the chart. TCE 220 may access the data symbol based on state aa and data contained in state block a As indicated above, FIGS. 9A-9E are provided merely as an example. Other examples are possible and may differ from what was described with regard to FIGS. 9A-9E.

In some implementations, TCE 220 may provide temporal expression and modeling for assessment and verification. For example, TCE 220 may provide specific tools for expressing and evaluating temporal conditions in a graphical environment (e.g., for graphical programming languages, such as, for example, Simulink and Stateflow). Typical graphical environments utilize complicated modeling and/or logic to express temporal conditions, which limits functional model verification using temporal conditions, particularly in an online domain (e.g., during simulation). In contrast, TCE 220 may simplify temporal expressions with mechanisms to define a time interval, operate on the interval and related signal conditions, and provide for combinations and outputs of intervals. For example, TCE 220 may utilize objects (e.g., Interval), predicates for those objects (e.g., Exactly), and/or combinatorial or reducing operators. In some implementations, the mechanisms utilized by TCE 220 may extend the capability of temporal modeling. For verification, TCE 220 may perform an assessment using the objects, the predicates, and logic in conjunction with graphical modeling methods, such as state charts.

In one example, functional and temporal expressions may be used for online assessment (e.g., during simulation) and offline assessment (e.g., post-simulation). For example, a functional expression for an online assessment may include "monitor this condition"; a temporal expression for an online assessment may include "monitor this interval with respect to condition(s)"; a functional expression for an offline assessment may include "analyze this condition in the signal log"; and a temporal expression for an offline assessment may include "analyze this interval with respect to condition(s), in the signal log." A functional assessment may include an assessment of signal conditions, where simulation time is a secondary consideration, or not considered at all. An example of a functional assessment may include checking that a signal does not exceed static or comparative limits. A temporal assessment may include an assessment of a time-dependent condition, where a simulation time window required to return an assessment result may vary based on predicates that define an interval.

In some implementations, TCE 220 may provide temporal expression and evaluation with interval objects, such as predicates (e.g., atmost, atleast, exactly, within, etc.) and logical operators (e.g., and, or, not, etc.) applied to both temporal and signal conditions; interval composition such as a union with other intervals; interval refinement, such as reduction using additional conditions and reduction using nested intervals; etc. In some implementations, an interval object may return a defined and deterministic output at any point in time for all temporal predicates, regardless of the time at which an interpretation result (e.g., pass or fail) of the interval object is known. For example, assume the following syntax is generated in a state chart block:

```
DuringYCheckX
assessments:
    IY = interval(y == 1).atleast(5, sec).atmost(10, sec);
    within IY
        verify(x ==0);
end
```

In such an example, the output IY may be defined for a time period of five to ten seconds regardless of the length of time y=1. To illustrate, consider the following assessment objective: "if, for the time period between a and b, y happens, verify x" (e.g., generalized); and "if, for between 5 seconds and 10 seconds, y is equal to 1, verify x is 0" (e.g., dimensionalized). In such an example, TCE 220 may simplify the temporal definition and assessment compared to typical graphical environments.

In some implementations, TCE 220 may enable declarative temporal assessments (e.g., interval/within/verify) to be written without drawing states and/or transitions at the beginning of during syntax (or some new code section). For example, assume that a user utilizes TCE 220 to generate the following syntax:

```
I = interval(x > 0);
within I
    y_T = record(y);
    verifyAtExit(sum(y_T) <= 5, 'Test1');
    verify(sum(y_T) <= 3, 'Test2');
end
```

In such an example, the syntax interval may create a virtual state (e.g., as an object like when); the remaining syntax may execute within each interval; the syntax record(y) may record y into a trace; and the syntax verifyAtExit, verify, and sum may be asserted within the interval at the end or all of the time.

In some implementations, TCE 220 may enable retroactive temporal intervals (e.g., atleast/atmost/exactly interval qualifiers) to be utilized. For example, some intervals may be detected retroactively (e.g., interval of at most 5 ticks long), may not be represented as states (e.g., without extensions), and may be detected using a set of states/transitions. TCE 220 may provide predicates with the syntax interval to represent retroactive intervals, such as interval( . . . ).atleast(N, evt) (e.g., intervals of at least N evts long); interval( . . . ).atmost(N, evt) (e.g., intervals of at most N evts long); interval ( . . . ).exactly(N, evt) (e.g., intervals of exactly N evts long); etc. In some implementations, TCE 220 may enable intervals of signals that match a certain pattern (e.g., interval(x).followedby(interval(y))) to be utilized.

In some implementations, TCE 220 may enable retroactive temporal intervals (e.g., tri-state/transactional interval signals) to be utilized. For example, nested syntax for interval and verify may be valid if an enclosing retroactive interval is confirmed. TCE 220 may provide tri-state/transactional signals that represent retroactive interval activity, such as inactive (0), active (1), canceled (−1) (e.g., a one tick delay to cancel, no delay to confirm). For example, TCE 220 may be utilized to generate the following syntax:

```
Ix = interval(x).atleast(5, tick);
Iy = interval(y).atmost(5, tick);
within Ix
    within Iy
        verify(z, 'Oz');
    end
end
```

In some implementations, TCE 220 may enable retroactive temporal intervals (e.g., tri-state/transactional interval signals) to be interpreted. For example, interpreting interval signals may be difficult so TCE 220 may post-process interval signals before drawing in simulation data inspector (SDI) (e.g., draw unconfirmed signals differently, and redraw upon confirmation/cancellation).

In some implementations, TCE 220 may provide unique extensions to the action language (e.g., the M language, a MATLAB® language, a MATLAB-compatible language, a MATLAB-like language, etc.) that abstract the concepts of time intervals, nested time intervals, and/or various temporal operates within the action language. These extensions may be utilized to concisely capture desired timed behavior in the action language for the purpose of simulation (e.g., execution), verification and validation (e.g., dynamic testing as well as static analysis), production and/or optimized code generation with respect to specified target languages, hardware systems, and/or budgetary concerns (e.g., RAM, ROM, speed, etc.), etc. In some implementations, the extensions may be used within Stateflow diagrams, state transition tables, truth tables, blocks within Simulink, system objects, timed MATLAB functions, etc.

In some implementations, the concept of time may include regular time or irregular time. For example, time may depend on a domain specific notion of clock (or multiple clocks), discrete or dense time, local events (e.g., within an epoch), communication messages (e.g., event and payload), exogenous events (e.g., crank shaft angle sensor), etc. For example, within a Simulink environment, time may include simulation time, and within a Stateflow environment, time may include an elapsed number of clock ticks, an absolute time relative to an associated state entry, counted occurrence of events, etc.

In some implementations, such high level abstraction may enable semantic driven optimizations and efficient synthesis of high level abstractions into various software or hardware languages utilizing available target resources with respect to a user-defined and target-specific balance between RAM, ROM, speed, etc. In some implementations, the concept of intervals may enable the possibility of parameterization leveraging of expressions and variables. This may permit users to create parameterized intervals whose attributes can dynamically change during execution.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of a technical computing environment (TCE) (e.g., via a touch screen display, a mouse, a keyboard, a keypad, voice commands, etc.).

The term generated code is to be broadly interpreted to include text-based code that may be automatically executed (e.g., C code, C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, generated code may include different combinations of the above-identified classes (e.g., text-based code, binary code, text files, etc.). Alternatively, or additionally, generated code may include code generated using a dynamically-typed programming language (e.g., the M language, a MATLAB® language, a MATLAB-compatible language, a MATLAB-like language, etc.) that can be used to express problems and/or solutions in mathematical notations. Alternatively, or additionally, generated code may be of any type, such as function, script, object, etc., and a portion of generated code may include one or more characters, lines, etc. of the generated code.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

As another example, an executable graphical model may include a state machine model (e.g., a graphical state machine model). The state machine model may include an executable time-based model. The state machine model may include a discrete-state transition system that evaluates its transitions at certain points in time. The points in time may be based on a periodic (and discrete) sample time or the points in time may be based on the change of truth value of an expression (e.g., an inequality). An evaluation of the transition system may be associated with the occurrence of an event and the evaluation may consist of evaluating whether a transition out of a state is enabled. A transition may be enabled when the associated event(s) occur and when the associated condition(s) are satisfied.

The state transition system may have input and output variables that may be obtained from and provided to other entities in the graphical model. As noted above, the graphical entities may represent time-based dynamic systems such as differential equation systems and difference equation systems. In some implementations, the graphical model and the graphical entities may represent a multi-domain dynamic system. The domains may include execution domains or behaviors such as, for example, continuous time, discrete time, discrete event, state transition systems, and/or a model of computation. The model of computation may be based on differential equations, difference equations, algebraic equations, discrete events, discrete states, stochastic relations, data flows, synchronous data flows, control flows, process networks, and/or state machines.

What is claimed is:

1. A method, comprising:
   receiving a chart generated via a technical computing environment, the chart including a textual portion and a graphical portion, the graphical portion including state information and time or event-based conditions, and the receiving the chart being performed by a device;
   parsing the chart into the textual portion and the graphical portion, the parsing being performed by the device;
   processing the textual portion with a textual engine of the technical computing environment to generate textual results, the processing the textual portion being performed by the device;
   transforming a portion of the graphical portion, which is not understood by a graphical engine of the technical computing environment, into a transformed graphical portion that is understood by the graphical engine, the transforming the portion of the graphical portion into the transformed graphical portion including: providing text included in the graphical portion to a transformer, and transforming, with the transformer, the text included in the graphical not being understood by the graphical engine, the text included in the graphical portion not being understood by the graphical engine, the transforming being performed by the device;
   processing the transformed graphical portion with a graphical engine of the technical computing environment to generate graphical results, the processing the transformed graphical portion with the graphical engine including: calculating the time or an event at which to execute the text including in the graphical portion based on transforming the text included in the graphical portion, the processing the transformed graphical portion being performed by the device;
   combining the textual results with the graphical results to generate chart results, the combining being performed by the device; and
   outputting or storing the chart results, the outputting or storing being performed by the device.

2. The method of claim 1, further comprising: utilizing the chart results to execute a model associated with the technical computing environment; and generating model results based on the execution of the model.

3. The method of claim 1, where receiving the chart further comprises:
   providing, for display, a user interface for creating the chart;
   receiving, via the user interface, a graphical hierarchy of state blocks for the chart;
   receiving, via the user interface, connections for the state blocks of the graphical hierarchy;
   receiving, via the user interface, graphical symbols associated with the state blocks, the state blocks, the connections, and the graphical symbols being part of the graphical portion of the chart; and receiving, via the user interface, textual code for the chart, the textual code being part of the textual portion of the chart.

4. The method of claim 3, further comprising:
linking, based on one or more of the graphical symbols, the textual code with one or more state blocks of the graphical hierarchy;
processing the chart to generate output code; and
executing the output code to generate output code results.

5. The method of claim 4, further comprising one of: storing the output code in storage associated with the device; or embedding the output code in a physical device separate from the device.

6. The method of claim 4, where linking the textual code with one or more state blocks further comprises:
identifying a particular symbol, from the graphical symbols, in the graphical hierarchy;
searching one or more levels of the graphical hierarchy for data or a function that matches the particular symbol;
adding an entry for the data or the function in a list of matches when the searching identifies the data or the function that matches the particular symbol; and
determining whether the list of matches includes a single entry, multiple entries, or no entries.

7. The method of claim 6, further comprising: linking the data or the function with the particular symbol when the list of matches includes a single entry; or generating an error message when the list of matches includes multiple entries or no entries.

8. The method of claim 1, where transforming the portion of the graphical portion into the transformed graphical portion comprises: transforming, with the transformer, the text included in the graphical portion to utilize counters; and where processing the transformed graphical portion with the graphical engine comprises: calculating the time or the event to execute the text included in the graphical portion based on the transforming the text included in the graphical portion to utilize counters.

9. A device, comprising: one or more processors to:
receive a chart generated via a technical computing environment, the chart including a textual portion and a graphical portion, and the graphical portion including state information,
divide the chart into the textual portion and the graphical portion,
process the textual portion with a textual engine of the technical computing environment to generate textual results, transform a portion of graphical portion, which is not understood by a graphical engine of the technical computing environment, into a transformed graphical portion that is understood by a graphical engine, where, when transforming the portion of the graphical portion into the transformed graphical portion, the one or more processors are to: provide text included in the graphical portion to a transformer, and transform, with the transformer, the text included in the graphical portion so that a time is calculated by the graphical engine, the text included in the graphical portion not being understood by the graphical engine,
process the transformed graphical portion and a remaining portion of the graphical portion with the graphical engine to generate graphical results, where, when processing the transformed graphical portion with the graphical engine, the one or more processors are to: calculate the time or an event at which to execute the text included in the graphical portion based on transforming the text included in the graphical portion, combine the textual results with the graphical results to generate chart results, and output or store the chart results.

10. The device of claim 9, where the one or more processors are further to: utilize the chart results to execute a model associated with the technical computing environment, and generate model results based on the execution of the model.

11. The device of claim 9, where, when receiving the chart, the one or more processors are further to:
provide, for display, a user interface for creating the chart,
receive, via the user interface, a graphical hierarchy of state blocks for the chart,
receive, via the user interface, connections for the state blocks of the graphical hierarchy,
receive, via the user interface, graphical symbols associated with the state blocks, the state blocks, the connections, and the graphical symbols being part of the graphical portion of the chart, and
receive, via the user interface, textual code for the chart, the textual code being part of the textual portion of the chart.

12. The device of claim 11, where the one or more processors are further to:
link, based on one or more of the graphical symbols, the textual code with one or more state blocks of the graphical hierarchy,
process the chart to generate output code, and
execute the output code to generate output code results.

13. The device of claim 12, where the one or more processors are further to:
store the output code in storage associated with the device, or
embed the output code in a physical device separate from the device.

14. The device of claim 12, where, when linking the textual code with one or more state blocks, the one or more processors are to:
identify a particular symbol, from the graphical symbols, in the graphical hierarchy,
search one or more levels of the graphical hierarchy for data or a function that matches the particular symbol,
add an entry for the data or the function in a list of matches when the searching identifies the data or the function that matches the particular symbol, and
determine whether the list of matches includes a single entry, multiple entries, or no entries.

15. The device of claim 14, where the one or more processors are further to:
link the data or the function with the particular symbol when the list of matches includes a single entry, or
generate an error message when the list of matches includes multiple entries or no entries.

16. A non-transitory computer-readable medium storing instructions, the instructions comprising: one or more instructions that, when executed by one or more processors of a device, cause the one or more processors to:
receive a model that includes a chart, the model and the chart being generated via a technical computing environment, the chart including a textual portion and a graphical portion, and the graphical portion including state information,
parse the chart into the textual portion and the graphical portion,
process the textual portion with a textual engine of the technical computing environment to generate textual results,
transform a portion of the graphical portion, which is not understood by a graphical engine of the technical computing environment, into a transformed graphical portion that is understood by the graphical engine, where the one or more instructions that cause the one or more processors to transform the portion of the graphical portion into the transformed graphical portion, cause the one or more processors to: provide text included in the graphical portion to a transformer, and transform, with the transformer, the text included in the graphical portion so that a time is calculated by the graphical engine, the text included in the graphical portion not being understood by the graphical engine, process the transformed graphical portion with a graphical engine of the technical computing environment to generate graphical results, where the one or more instructions that cause the one or more processors to process the transformed graphical portion with the graphical engine, cause the one or more processors to: calculate the time or an event at which to execute the text included in the graphical portion based on transforming the text included in the graphical portion, combine the textual results with the graphical results to generate chart results, utilize the chart results to execute the model, and generate model results based on the execution of the model.

17. The non-transitory computer-readable medium of claim 16, where the instructions further comprise: one or more instructions that, when executed by the one or more processors, cause the one or more processors to:

provide, for display, a user interface for creating the chart, receive, via the user interface, a graphical hierarchy of state blocks for the chart, receive, via the user interface, connections for the state blocks of the graphical hierarchy, receive, via the user interface, graphical symbols associated with the state blocks, the state blocks, the connections, and the graphical symbols being part of the graphical portion of the chart, and receive, via the user interface, textual code for the chart, the textual code being part of the textual portion of the chart.

18. The non-transitory computer-readable medium of claim 17, where the instructions further comprise: one or more instructions that, when executed by the one or more processors, cause the one or more processors to:

link, based on one or more of the graphical symbols, the textual code with one or more state blocks of the graphical hierarchy, process the chart to generate output code, and execute the output code to generate output code results.

19. The non-transitory computer-readable medium of claim 18, where the instructions further comprise: one or more instructions that, when executed by the one or more processors, cause the one or more processors to one of:

store the output code in storage associated with the device, or embed the output code in a physical device separate from the device.

20. The computer-readable medium of claim 18, where the instructions further comprise: one or more instructions that, when executed by the one or more processors, cause the one or more processors to:

identify a particular symbol, from the graphical symbols, in the graphical hierarchy, search one or more levels of the graphical hierarchy for data or a function that matches the particular symbol, add an entry for the data or the function in a list of matches when the searching identifies the data or the function that matches the particular symbol, and determine whether the list of matches includes a single entry, multiple entries, or no entries.

* * * * *